US012734758B2

(12) United States Patent
Ding et al.

(10) Patent No.: US 12,734,758 B2
(45) Date of Patent: Sep. 15, 2026

(54) METHOD AND APPARATUS FOR CALIBRATING EXPOSURE SURFACE OF OPTICAL SYSTEM, CALIBRATION MEASUREMENT METHOD AND APPARATUS, AND COMPUTER DEVICE AND STORAGE MEDIUM

(71) Applicant: GUANGZHOU HEYGEARS IMC. INC, Guangzhou (CN)

(72) Inventors: Peng Ding, Guangzhou (CN); Jun Hu, Guangzhou (CN); Hongqing Zeng, Guangzhou (CN); Xin Wan, Guangzhou (CN); Bin Xu, Guangzhou (CN)

(73) Assignee: GUANGZHOU HEYGEARS IMC. INC, Guangzhou (CN)

( * ) Notice: Subject to any disclaimer, the term of this patent is extended or adjusted under 35 U.S.C. 154(b) by 135 days.

(21) Appl. No.: 18/393,477

(22) Filed: Dec. 21, 2023

(65) Prior Publication Data

US 2024/0131793 A1 Apr. 25, 2024

Related U.S. Application Data

(63) Continuation-in-part of application No. PCT/CN2022/107529, filed on Jul. 22, 2022.

(30) Foreign Application Priority Data

Jul. 22, 2021 (CN) ......................... 202110832043.6

(51) Int. Cl.
*B29C 64/386* (2017.01)
*B29C 64/264* (2017.01)
(Continued)

(52) U.S. Cl.
CPC .......... *B29C 64/386* (2017.08); *B29C 64/264* (2017.08); *B33Y 50/00* (2014.12);
(Continued)

(58) Field of Classification Search
CPC ... B29C 64/386; B29C 64/393; B29C 64/286; B29C 64/277; B29C 64/282; B22F 10/12
See application file for complete search history.

(56) References Cited

U.S. PATENT DOCUMENTS

2009/0244329 A1 10/2009 Kuniba
2016/0221267 A1* 8/2016 John ..................... B29C 64/129
(Continued)

FOREIGN PATENT DOCUMENTS

CN 105137720 A 12/2015
CN 106127842 A 11/2016
(Continued)

OTHER PUBLICATIONS

ISR for PCT/CN2022/107529 mailed Oct. 10, 2022.
The first office action of counterpart JP application No. 2023580988 issued on Oct. 29, 2024.

*Primary Examiner* — Yung-Sheng M Tsui
(74) *Attorney, Agent, or Firm* — The Sun IP Law

(57) ABSTRACT

Disclosed in the disclosure are a method and apparatus for calibrating an exposure surface of an optical system, and a computer device and a storage medium. The method includes: performing flat-field correction on a photographing module; acquiring a grayscale distribution image; segmenting the grayscale distribution image into a mesh image including a plurality of segmented regions, and calculating a fitting grayscale value of each segmented region; selecting, as a reference grayscale value, a minimum fitting grayscale value from all the fitting grayscale values obtained through calculation, and calculating grayscale compensation coefficients corresponding to the other segmented regions, so as to
(Continued)

generate a digital mask; and performing mask compensation, by using the digital mask, on a light projection image projected by the optical system, so as to obtain a printed image of which the exposure surface has a uniform irradiance value.

19 Claims, 6 Drawing Sheets

(51) Int. Cl.

*B33Y 50/00* (2015.01)
*G06T 7/00* (2017.01)
*G06T 7/11* (2017.01)
*G06T 7/136* (2017.01)
*G06T 7/80* (2017.01)

(52) U.S. Cl.

CPC ................ *G06T 7/001* (2013.01); *G06T 7/11* (2017.01); *G06T 7/136* (2017.01); *G06T 7/80* (2017.01); *G06T 2207/30144* (2013.01)

(56) References Cited

U.S. PATENT DOCUMENTS

| | | | | |
|---|---|---|---|---|
| 2018/0144219 | A1* | 5/2018 | Kalisman | B29C 64/10 |
| 2021/0142886 | A1* | 5/2021 | Min | G01F 9/00 |

FOREIGN PATENT DOCUMENTS

| | | | | | |
|---|---|---|---|---|---|
| CN | 106228598 | A | | 12/2016 | |
| CN | 106273487 | A | * | 1/2017 | B33Y 30/00 |
| CN | 209176181 | U | * | 7/2019 | |
| CN | 112848301 | A | | 5/2021 | |
| CN | 112959662 | A | | 6/2021 | |
| CN | 113034382 | A | * | 6/2021 | G06T 5/90 |
| CN | 113103587 | A | | 7/2021 | |
| CN | 113469918 | A | | 10/2021 | |
| CN | 113469918 | B | * | 2/2024 | G06T 5/94 |
| JP | H05127272 | A | | 5/1993 | |
| JP | 2001237164 | A | | 8/2001 | |
| JP | 2004271421 | A | | 9/2004 | |
| JP | 2005086172 | A | | 3/2005 | |
| JP | 2016173558 | A | | 9/2016 | |
| JP | 2019511748 | A | | 4/2019 | |
| JP | 2020507052 | A | | 3/2020 | |

* cited by examiner

Imaging surface reference light source

Region 2'

……

Region p'

Region p'*q'

100

Exposure surface calibration method for an optical system

S701

A static contrast ratio and a dynamic contrast ratio of the optical system are measured

S702

The clarity of a projection image is measured

S703

Whether there is dirt on an optical machine device is detected

S704

The size of a photographed object is measured

METHOD AND APPARATUS FOR CALIBRATING EXPOSURE SURFACE OF OPTICAL SYSTEM, CALIBRATION MEASUREMENT METHOD AND APPARATUS, AND COMPUTER DEVICE AND STORAGE MEDIUM

CROSS-REFERENCE TO RELATED APPLICATION

The disclosure claims priority to Chinese patent application No. 202110832043.6 filed to the China National Intellectual Property Administration on Jul. 22, 2021 and entitled "Method and Apparatus for Calibrating Exposure Surface of Optical System, and Computer Device and Storage Medium", the disclosure of which is hereby incorporated by reference in its entirety.

TECHNICAL FIELD

The disclosure relates to the technical field of optical systems, and in particular, to a method and apparatus for calibrating an exposure surface of an optical system, a calibration measurement method and apparatus, and a computer device and a storage medium.

BACKGROUND

A 3D printing technology in the related art usually uses Digital Light Processing (DLP) and Liquid Crystal Display (LCD) technologies to realize a surface printing process in the field of photocuring. A DLP photocuring printer uses a high-resolution DLP device and an ultraviolet light source to project the cross section of a three-dimensional model on a workbench, so as to perform photocuring on liquid photopolymer layer by layer. An LCD photocuring printer is similar to the DLP photocuring printer; and the difference between the LCD photocuring printer and the DLP photocuring printer is that the LCD photocuring printer directly displays the cross section on the workbench by using an LCD to replace a DLP projection system. The DLP and the LCD both belong to a print surface exposure technology; and during 3D printing, the irradiance at each point in an exposure surface is required to be kept the same. If there is an excessive difference in the irradiance in the exposure surface, vertical grains appear on the surface of a printed finished product; and in severe cases, the print will fall off from a printing platform, resulting in printing failure.

A generally used light source calibration technology is to segment an entire format of a print region into several measurement point locations, and an optical power meter is used to measure the irradiance of each point location, so as to obtain irradiance distribution data of each point location. Then reverse calculation is performed on a grayscale compensation value of each point location according to data distribution; and the region of each point location is projected or displayed by using grayscales after the compensation values are calculated, so as to realize uniformity calibration of the entire exposure surface.

However, this method is greatly limited. For example, point location irradiance measurement after format segmentation may only indicate the irradiance at the point location, which is a discrete point location value. However, the discrete point location value is used to replace a region distribution value of a corresponding segmentation surface, that is, a discrete point is used to represent the uniform distribution in a plane, the distribution value between discrete points is replaced by two points, resulting in reduction of uniformity correction accuracy. The accuracy is improved generally by increasing the number of format segmentation point locations, but this leads to an increase in detection increasing time and difficulty. In addition, due to long-term use of a printing device, and device loss and replacement in an optical system, the grayscale compensation value after the previous calibration is changed, such that the uniformity of the print region needs to be continuously corrected, thus consuming more manpower and time investment.

SUMMARY

The disclosure provides a method and apparatus for calibrating an exposure surface of an optical system, and a computer device and a storage medium, which aim at improving the calibration accuracy and calibration efficiency of an exposure surface of an optical system.

According to a first aspect, the disclosure provides a method for calibrating an exposure surface of an optical system. The method for calibrating the exposure surface of the optical system may include the following operations.

Flat-field correction is performed on a photographing module by using a reference light source.

A grayscale distribution image generated by photographing an exposure surface of an optical system by the photographing module is acquired.

The grayscale distribution image is segmented into a mesh image comprising a plurality of segmented regions, and a fitting grayscale value of each segmented region is calculated.

A predetermined fitting grayscale value is selected as a reference grayscale value from all the fitting grayscale values obtained through calculation, and grayscale compensation coefficients corresponding to the other segmented regions are calculated according to the reference grayscale value, so as to generate a digital mask.

The digital mask is used to perform mask compensation on a light projection image emitted by the optical system, so as to obtain a printed image of which the exposure surface has a uniform irradiance value.

As at least one alternative embodiment, selecting, as the reference grayscale value, the predetermined fitting grayscale value from all the fitting grayscale values obtained through calculation includes: selecting, as the reference grayscale value, a minimum fitting grayscale value from all the fitting grayscale values obtained through calculation.

As at least one alternative embodiment, wherein acquiring the grayscale distribution image generated by photographing the exposure surface of the optical system by the photographing module includes: acquiring a first grayscale distribution image and a second grayscale distribution image, wherein the first grayscale distribution image is obtained by photographing a first image that is projected by the optical system, the second grayscale distribution image is obtained by photographing a second image that is projected by the optical system, a first grayscale region in the first image corresponds to a second grayscale region in the second image, and a second grayscale region in the first image corresponds to a first grayscale region in the second image; and processing the first grayscale distribution image and the second grayscale distribution image, so as to obtain the grayscale distribution image.

As at least one alternative embodiment, wherein the first grayscale region in the first image and the second grayscale region in the first image are arranged at intervals; the first grayscale region in the second image and the second grayscale region in the second image are arranged at intervals; the first grayscale region in the first image is circular or square; and the first grayscale region in the second image is circular or square.

As at least one alternative embodiment, wherein the first grayscale region is a white region, and the second grayscale region is a black region.

As at least one alternative embodiment, wherein a lens of the photographing module is provided with an optical filter.

As at least one alternative embodiment, wherein performing flat-field correction on the photographing module by using the reference light source includes: projecting, by the reference light source, an exposure surface having a uniform irradiance value; photographing the exposure surface of the reference light source by the photographing module, so as to obtain a reference light source image; acquiring a grayscale output value of each pixel unit in a photosensitive chip according to the reference light source image, and comparing a preset grayscale value of the reference light source with the grayscale output value of each pixel unit, so as to obtain a grayscale correction coefficient of each pixel unit; and performing the flat-field correction on the photographing module according to the grayscale correction coefficient of each pixel unit.

As at least one alternative embodiment, wherein the projecting, by the reference light source, an exposure surface having a uniform irradiance value including: projecting, by the reference light source, server exposure surfaces having a uniform irradiance value; the photographing the exposure surface of the reference light source by the photographing module, so as to obtain a reference light source image including: photographing each exposure surface of the server exposure surfaces by the photographing module, so as to obtain server exposure surface images, wherein afirst grayscale region of each exposure surface corresponds to a second grayscale region, overlapped to the first grayscale region, of remaining exposure surfaces; processing the server exposure surface images to obtain the reference light source image.

As at least one alternative embodiment, wherein photographing the exposure surface of the reference light source by the photographing module, so as to obtain a reference light source image includes: dividing an image-taking surface of the photographing module into several image-taking sub-regions on the basis of a size of the exposure surface of the reference light source; moving the reference light source, and respectively projecting to the image-taking sub-regions by the reference light source, so as to obtain several reference light source sub-images with each reference light source sub-image corresponding to each image-taking sub-region; and splicing the several reference light source sub-images, so as to obtain the reference light source image.

As at least one alternative embodiment, further including: limiting an exposure of the photographing module; adjusting an irradiance value of an exposure surface of the reference light source, and acquiring a corresponding grayscale value by using the photographing module, so as to generate a relationship curve between grayscale and the irradiance value by fitting; and on the basis of the relationship curve, performing grayscale reading, by using the photographing module, on the light projection image emitted by the optical system, so as to obtain a corresponding irradiance value.

As at least one alternative embodiment, wherein the adjusting an irradiance value of an exposure surface of the reference light source, and acquiring a corresponding grayscale value by using the photographing module, so as to generate a relationship curve between grayscale and the irradiance value by fitting including: adjusting the irradiance value of the exposure surface of the reference light source, wherein the reference light source is exposed based on a wavelength curve; photographing the exposure surface by the photographing module, so as to obtain a corresponding gray value, wherein the gray value is obtained based on the wavelength curve and a photoelectric response function of the photographing module; obtaining the relationship curve between the gray value and the irradiance value by fitting based on the irradiance value and the corresponding gray value.

As at least one alternative embodiment, further including: acquiring an irradiation control parameter and corresponding image information of the optical system; acquiring a first relationship between the image information and irradiation data of the optical system; and obtaining a second relationship between the irradiation control parameter and the irradiation data of the optical system on the basis of the first relationship, the irradiation control parameter, and the corresponding image information, wherein the second relationship is configured to adjust the irradiation data during 3D printing.

As at least one alternative embodiment, acquiring the first relationship between the image information of the optical system and the irradiation data includes: acquiring a third relationship between image information of the reference light source and the image information of the optical system, and a fourth relationship between the image information of the reference light source and irradiation data of the reference light source; and obtaining the first relationship at least on the basis of the third relationship and the fourth relationship, wherein the third relationship meets the image information of the reference light source being consistent with or deviating from the image information of the optical system.

As at least one alternative embodiment, acquiring the grayscale distribution image generated by photographing the exposure surface of the optical system by the photographing module includes: adjusting the exposure of the photographing module, so as to cause a grayscale value of the grayscale distribution image obtained through photographing to be below a maximum grayscale value.

As at least one alternative embodiment, a fitting algorithm is used to calculate the fitting grayscale value of each segmented region; and the fitting algorithm is a least square method, a polynomial fitting algorithm, or a cubic spline fitting algorithm.

As at least one alternative embodiment, selecting, as the reference grayscale value, the minimum fitting grayscale value from all the fitting grayscale values obtained through calculation, and calculating, according to the reference grayscale value, the grayscale compensation coefficients corresponding to the other segmented regions, so as to generate the digital mask includes: successively labeling all the fitting grayscale values as P11, P12, . . . , Pmn according to a sequence of corresponding segmented regions, so as to obtain a grayscale array of $$\begin{pmatrix} P_{11} & \cdots & P_{1n} \\ \vdots & \ddots & \vdots \\ P_{m1} & \cdots & P_{mn} \end{pmatrix}$$

of which number of terms is m*n; selecting, as the minimum fitting grayscale value, a minimum value Pmin from the grayscale array, and performing normalized ratio calculation on the minimum fitting grayscale value and other data in the grayscale array, so as to obtain a ratio matrix; and using ratios comprised in the ratio matrix as the corresponding grayscale compensation coefficients, and then multiplying a required image grayscale value and the ratios in the ratio matrix, so as to obtain the corresponding digital mask.

According to a second aspect, the disclosure provides a calibration measurement method for 3D printing. The calibration measurement method may include: calibrating an exposure surface of an optical system by using the above method for calibrating the exposure surface of an optical system; acquiring a first irradiance value corresponding to a white image and a second irradiance value corresponding to a black image, where the white image and the black image are both obtained through projection of the calibrated optical system; obtaining a static contrast ratio of the optical system according to the first irradiance value and the second irradiance value; acquiring an irradiance value of each region in a chessboard map, where the chessboard map is obtained through projection of the calibrated optical system; and processing an irradiance value of each region by using an ANSI contrast calculation method, so as to obtain a dynamic contrast ratio of the optical system.

According to a third aspect, the disclosure provides a method for calibrating an exposure surface of an optical system. The method for calibrating the exposure surface of the optical system may include the following operations.

An image information distribution image generated by photographing an exposure surface of an optical system by a photographing module is acquired.

The image information distribution image is segmented, and a mapping image information value of each segmented region is calculated.

A reference mapping image information value is selected from the mapping image information values, and compensation parameters corresponding to other segmented regions are calculated according to the reference mapping image information value, where the compensation parameters are configured to perform mask compensation on a light projection image emitted by the optical system, so as to obtain a printed image of which the exposure surface has a uniform irradiance value.

According to a fourth aspect, the disclosure provides an apparatus for calibrating an exposure surface of an optical system. The apparatus may include an image acquisition unit, a fitting unit, a selection unit, and a mask compensation unit.

The image acquisition unit is configured to acquire a grayscale distribution image generated by photographing an exposure surface of an optical system by a photographing module.

The fitting unit is configured to segment the grayscale distribution image into a mesh image comprising a plurality of segmented regions, and calculate a fitting grayscale value of each segmented region.

The selection unit is configured to select, as a reference grayscale value, a minimum fitting grayscale value from all the fitting grayscale values obtained through calculation, and calculate, according to the reference grayscale value, grayscale compensation coefficients corresponding to the other segmented regions, so as to generate a digital mask.

The mask compensation unit is configured to use the digital mask to perform mask compensation on a light projection image emitted by the optical system, so as to obtain a printed image of which the exposure surface has a uniform irradiance value.

According to a fifth aspect, the disclosure provides a computer device. The computer device includes a memory, a processor, and a computer program that is stored on the memory and executable on the processor. The processor, when executing the computer program, implements the method for calibrating the exposure surface of the optical system and the calibration measurement method for 3D printing.

According to a sixth aspect, the disclosure provides a computer-readable storage medium. The computer-readable storage medium stores a computer program. When the computer program is executed by a processor, the method for calibrating the exposure surface of the optical system and the calibration measurement method for 3D printing are implemented.

According to a seventh aspect, the disclosure provides a computer program product. The computer program product includes a computer program. When the computer program is executed by a processor, the method for calibrating the exposure surface of the optical system and the calibration measurement method for 3D printing are implemented.

According to a tenth aspect, the disclosure provides a calibration measurement method for 3D printing, including: calibrating an optical system; detecting at least one of following: a contrast ratio of the optical system; a clarity of the optical system; a dirt of the optical system; a size of an exposure surface of the optical system; wherein calibrating an optical system includes: performing flat-field correction on a photographing module by using a reference light source; acquiring a grayscale distribution image generated by photographing an exposure surface of an optical system by the photographing module; segmenting the grayscale distribution image into a mesh image including a plurality of segmented regions, and calculating a fitting grayscale value of each segmented region; selecting, as a reference grayscale value, a predetermined fitting grayscale value from all the fitting grayscale values obtained through calculation, and calculating, according to the reference grayscale value, grayscale compensation coefficients corresponding to the other segmented regions, so as to generate a digital mask; and performing mask compensation, by using the digital mask, on a light projection image emitted by the optical system, so as to obtain a printed image of which the exposure surface has a uniform irradiance value.

As at least one alternative embodiment, detecting the contrast ratio of the optical system including: acquiring a first irradiance value corresponding to a white image and a second irradiance value corresponding to a black image, wherein the white image and the black image are both obtained through projection of the calibrated optical system; obtaining a static contrast ratio of the optical system according to the first irradiance value and the second irradiance value; acquiring an irradiance value of each region in a chessboard map, wherein the chessboard map is obtained through projection of the calibrated optical system; and processing the irradiance value of each region by using an ANSI contrast calculation method, so as to obtain a dynamic contrast ratio of the optical system; and/or, detecting the clarity of the optical system including: controlling the calibrated optical system to project an image to a preset position on alight projection format, wherein the image includes at least one line in a sagittal direction and at least one line in a meridian direction; acquiring an actual grayscale distribution curve of the projected image, and confirming a Contrast Transfer Function (CTF) value or a Modulation Transfer Function (MTF) value corresponding to each preset position according to the actual grayscale distribution curve and a preset grayscale distribution curve; and determining a clarity of the optical system according to the CTF value or the MTF value corresponding to each preset position; and/or, detecting the dirt of the optical system including: if a value of any point on the actual grayscale distribution curve is lower than a lower limiting value, and/or there is a mutation curve in the actual grayscale distribution curve, determining that there is dirt on the optical system; and/or, detecting the size of an exposure surface of the optical system: calibrating a size corresponding to each pixel on a photographing surface in a camera module, and determining a size of a photographed object according to the number of the pixels that are occupied by a side length of the photographed object; and/or, acquiring a size of the photographing surface in the camera module, and determining the size of the photographed object according to a ratio of the photographing surface occupied by a side length of the photographed object.

As at least one alternative embodiment, if any CTF value is less than a first set value, or any MTF value is less than a second set value, determining that the clarity of the optical system is unqualified.

According to a eleventh aspect, the disclosure provides computer device, including a memory, a processor, and a computer program that is stored on the memory and executable on the processor, wherein the processor, when executing the computer program, implements a method for calibrating the exposure surface of the optical system, wherein the method for calibrating the exposure surface of the optical system includes: acquiring an image information distribution image generated by photographing an exposure surface of an optical system by a photographing module; segmenting the image information distribution image, and calculating a mapping image information value of each segmented region; and selecting a reference mapping image information value from the mapping image information values, and calculating, according to the reference mapping image information value, compensation parameters corresponding to other segmented regions, wherein the compensation parameters are configured to perform mask compensation on alight projection image emitted by the optical system, so as to obtain a printed image of which the exposure surface has a uniform irradiance value.

The disclosure provides the method and apparatus for calibrating the exposure surface of the optical system, and the computer device and the storage medium. The method includes: performing flat-field correction on the photographing module by using the reference light source; acquiring the grayscale distribution image generated by photographing the exposure surface of the optical system by the photographing module; segmenting the grayscale distribution image into the mesh image including the plurality of segmented regions, and calculating the fitting grayscale value of each segmented region; selecting, as the reference grayscale value, the minimum fitting grayscale value from all the fitting grayscale values obtained through calculation, and calculating, according to the reference grayscale value, the grayscale compensation coefficients corresponding to the other segmented regions, so as to generate the digital mask; and using the digital mask to perform mask compensation on the light projection image emitted by the optical system, so as to obtain the printed image of which the exposure surface has the uniform irradiance value. In the disclosure, by acquiring all pixel-level distributions of irradiance values of an exposure surface, converting discrete distribution with relatively low density, and then performing corresponding compensation on a grayscale value, the calibration accuracy and calibration efficiency of the exposure surface of an optical system may be effectively improved.

BRIEF DESCRIPTION OF THE DRAWINGS

In order to describe the technical solutions in embodiments of the disclosure more clearly, the drawings required to be used in the embodiments will be simply introduced below. It is apparent that the drawings in the following descriptions are some embodiments of the disclosure. Those of ordinary skill in the art may further obtain other drawings according to these drawings without creative work.

DETAILED DESCRIPTION OF THE EMBODIMENTS

The technical solutions in the embodiments of the disclosure will be clearly and completely described below in combination with the drawings in the embodiments of the disclosure. It is apparent that the described embodiments are part of the embodiments of the disclosure, not all the embodiments. All other embodiments obtained by those of ordinary skill in the art on the basis of the embodiments in the disclosure without creative work all fall within the scope of protection of the disclosure.

It should be understood that, when being used in this specification and the appended claims, the terms "comprising" and "including" indicate the presence of the described features, integrals, steps, operations, elements, and/or components, but do not preclude the presence or addition of one or more of other features, integrals, steps, operations, elements, components, and/or a combination thereof.

It should also be understood that, the terms used herein in the specification of the disclosure is used solely for the purpose of describing specific embodiments and is not intended to limit the disclosure. As used in the specification of the disclosure and the appended claims, the singular forms "one", "a" and "the" are intended to include the plural form unless the context clearly indicates otherwise.

It should be further understood that, the term "and/or" as used in the specification of the disclosure and the appended claims refers to any combination of one or more of the items listed in association and all possible combinations, and includes these combinations.

Figure 1:
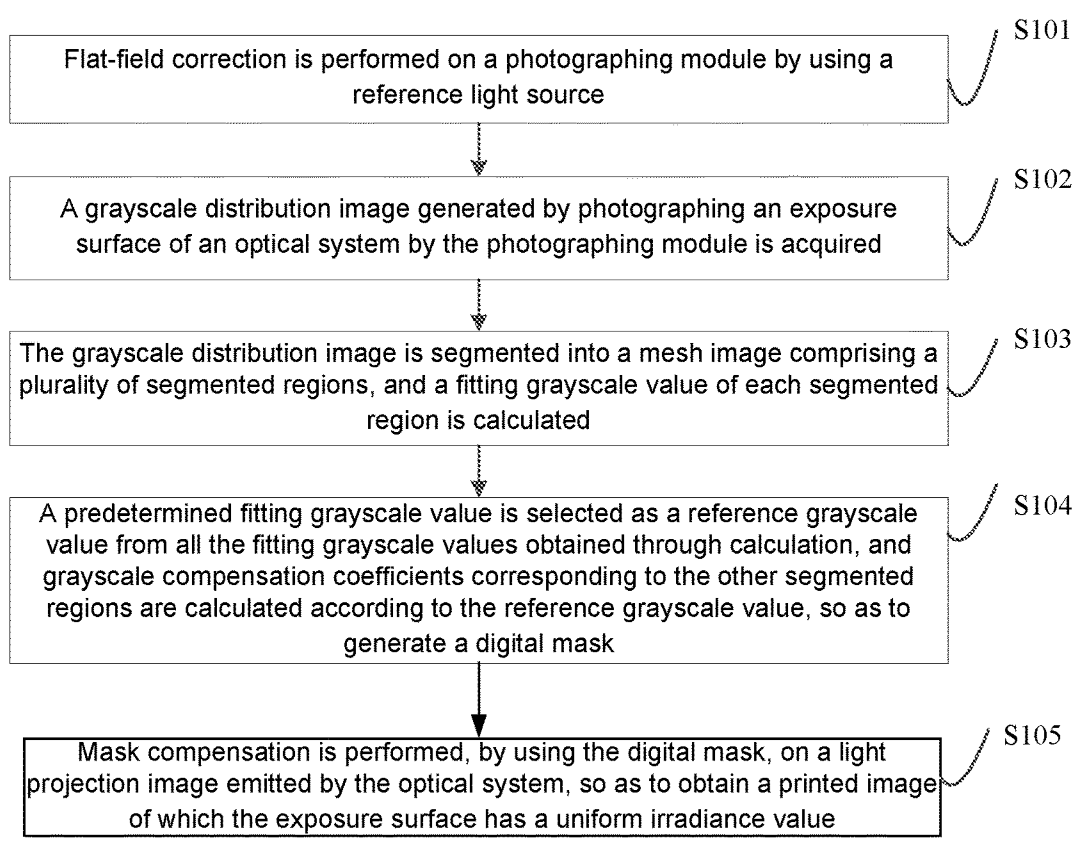
FIG. 1 is a schematic flowchart of a method for calibrating an exposure surface of an optical system according to an embodiment of the disclosure.

Referring to FIG. 1, FIG. 1 is a schematic flowchart of a method for calibrating an exposure surface of an optical system according to an embodiment of the disclosure. Details include S101 to S105.

At S101, flat-field correction is performed on a photographing module by using a reference light source.

At S102, a grayscale distribution image generated by photographing an exposure surface of an optical system by the photographing module is acquired.

At S103, the grayscale distribution image is segmented into a mesh image comprising a plurality of segmented regions, and a fitting grayscale value of each segmented region is calculated.

At S104, a predetermined fitting grayscale value is selected as a reference grayscale value from all the fitting grayscale values obtained through calculation, and grayscale compensation coefficients corresponding to the other segmented regions are calculated according to the reference grayscale value, so as to generate a digital mask.

At S105, mask compensation is performed, by using the digital mask, on alight projection image emitted by the optical system, so as to obtain a printed image of which the exposure surface has a uniform irradiance value.

It is to be understood that, the fitting grayscale value may refer to a value that is obtained by mapping grayscale distribution in a region. The predetermined fitting grayscale value is selected as the reference grayscale value from all the fitting grayscale values obtained through calculation. The predetermined fitting grayscale value may be adjusted according to practical experience of the optical system. According to needs, the predetermined fitting grayscale value may be any fitting grayscale value in all the fitting grayscale values obtained through calculation. In some implementations, the predetermined fitting grayscale value may be equal to a minimum fitting grayscale value×50%+a maximum fitting grayscale value×50%. In some other implementations, the predetermined fitting grayscale value may be equal to a minimum fitting grayscale value×75%+a maximum fitting grayscale value×25%. It is to be noted that, another value may be used as the reference grayscale value.

In some embodiments, the minimum fitting grayscale value may be selected as the reference grayscale value. When the minimum fitting grayscale value is selected as the reference grayscale value, an optical machine performs image projection at maximum brightness when optical uniformity calibration is performed. When the minimum fitting grayscale value is not used as the reference grayscale value, calibration needs to be performed when the brightness of the optical machine is reduced, such that grayscale can also be increased for points below the reference value, so as to achieve uniform grayscale calibration of the exposure surface.

Figure 2:
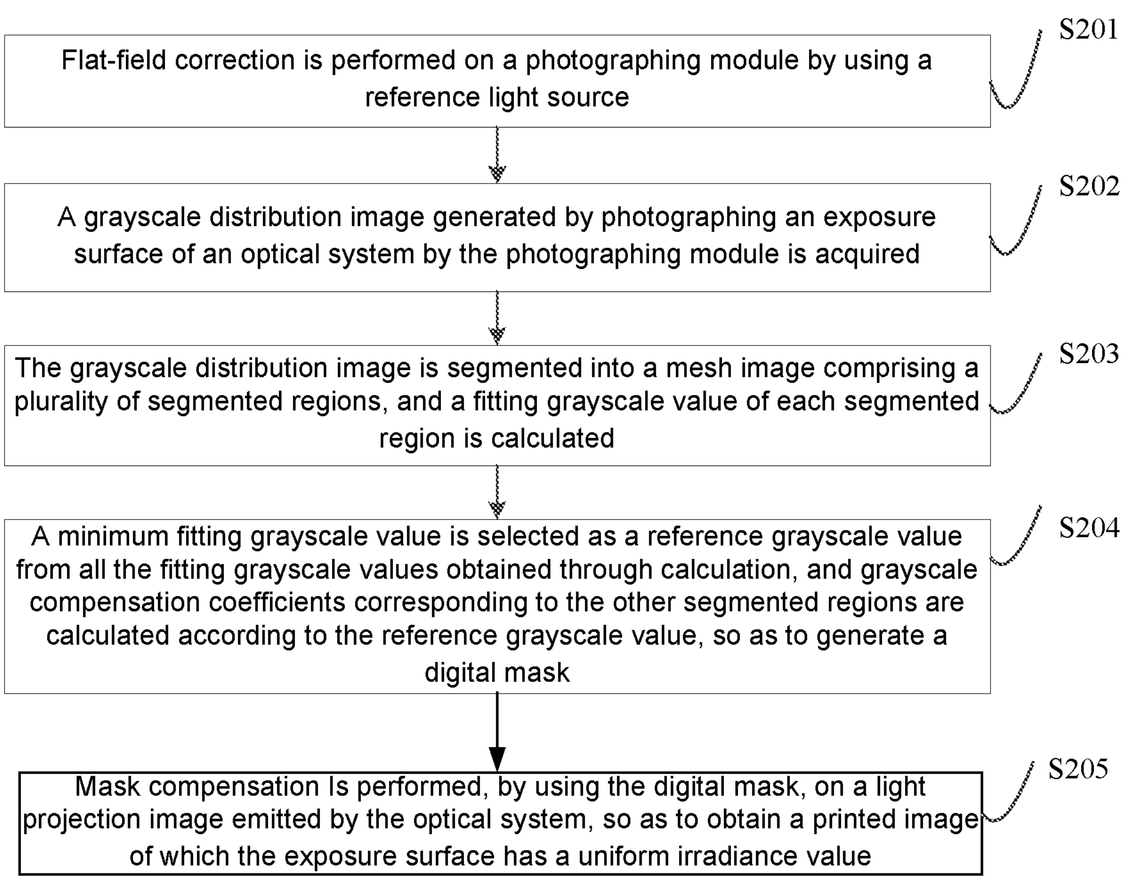
FIG. 2 is a schematic flowchart of a method for calibrating an exposure surface of an optical system according to another embodiment of the disclosure.

Referring to FIG. 2 below, the embodiment of selecting the minimum fitting grayscale value as the reference grayscale value is described in detail. FIG. 2 is a schematic flowchart of a method for calibrating an exposure surface of an optical system according to another embodiment of the disclosure. Details may include S202 to S205.

At S202, a grayscale distribution image generated by photographing an exposure surface of an optical system by the photographing module is acquired.

At S203, the grayscale distribution image is segmented into a mesh image comprising a plurality of segmented regions, and a fitting grayscale value of each segmented region is calculated.

At S204, a minimum fitting grayscale value is selected as a reference grayscale value from all the fitting grayscale values obtained through calculation, and grayscale compensation coefficients corresponding to the other segmented regions are calculated according to the reference grayscale value, so as to generate a digital mask.

At S205, mask compensation is performed, by using the digital mask, on alight projection image emitted by the optical system, so as to obtain a printed image of which the exposure surface has a uniform irradiance value.

In this embodiment, first, a light guiding film is used on the exposure surface to receive a full-format white image that is projected or displayed by the optical system, that is, the light projection image; a $2^n-1$ full-range white image in a n-bit image is set to be used; and using an 8-bit image as an example, 255 full-range white image in 0-255 grayscale may be set to be used, such that a full-white imaging surface may be seen on the back side of the light guiding film, which is a printing surface of a printer. Then, the photographing module is placed right above the light guiding film to photograph the imaging surface, so as to obtain an image-taking surface; and the photographing module is used to convert each irradiance value on the exposure surface of the optical system into different grayscale, so as to obtain the corresponding grayscale distribution image. The grayscale distribution image is then segmented to calculate the fitting grayscale value, and the corresponding minimum fitting grayscale value and the grayscale compensation coefficient are obtained so as to generate the digital mask. The light projection image is compensated by means of the digital mask, such that uniform calibration for the exposure surface may be achieved, and the finally obtained printed image has a uniform irradiance value. It is to be further noted that, the reference light source in this embodiment is a reference high uniform surface light source in a flat-field correction technology. That is to say, before S202, the method further includes the following step. At S201, flat-field correction is performed on a photographing module by using a reference light source.

In this embodiment, by acquiring all pixel-level distributions of irradiance values of an exposure surface, converting to discrete distribution with relatively low density, and then performing corresponding compensation on a grayscale value, the calibration accuracy and calibration efficiency of the exposure surface of an optical system may be effectively improved. Meanwhile, non-contact overall measurement is further realized by means of the photographing module, such that a multi-step repetitive operation is avoided, thereby saving measurement time. In addition, the correction accuracy of this embodiment may also be adjusted according to actual situations, without adding extra operation steps.

It is to be noted that, the irradiance value mentioned in the disclosure may also be represented by using another physical quantity light intensity, and the two may be used interchangeably.

In an embodiment, further provided is a method for calibrating an exposure surface of an optical system. The method includes the following operations.

An image information distribution image generated by photographing an exposure surface of an optical system by a photographing module is acquired.

The image information distribution image is segmented, and a mapping image information value of each segmented region is calculated.

A reference mapping image information value is selected from the mapping image information values, and compensation parameters corresponding to other segmented regions are calculated according to the reference mapping image information value, where the compensation parameters are configured to perform mask compensation on a light projection image emitted by the optical system, so as to obtain a printed image of which the exposure surface has a uniform irradiance value.

The image information may be grayscale, brightness, and other similar physical quantities. The image information distribution image is a grayscale information distribution image or a brightness information distribution image. The compensation parameters may be compensation coefficients or compensation values. The mapping image information value is obtained by mapping grayscale distribution in a mesh, and may be acquired by means of fitting or interpolation. The fitting algorithm includes, but is not limited to, a least square method, a polynomial fitting algorithm, or a cubic spline fitting algorithm.

As at least one alternative embodiment, the digital mask may be generated by means of the compensation parameters; and the digital mask is used to perform mask compensation on the light projection image, so as to obtain the printed image of which the exposure surface has the uniform irradiance value. In a specific example, before the step of acquiring the image information distribution image generated by photographing the exposure surface of the optical system by the photographing module, the method further includes: performing flat-field correction on the photographing module by using the reference light source.

In an embodiment, S201 may include the following operations.

The reference light source projects an exposure surface having a uniform irradiance value according to the preset grayscale value.

The photographing module photographs the exposure surface of the reference light source, so as to obtain a reference light source image.

A grayscale output value of each pixel unit in a photosensitive chip is acquired according to the reference light source image, and a preset grayscale value of the reference light source is compared with the grayscale output value of each pixel unit, so as to obtain a grayscale correction coefficient of each pixel unit.

Flat-field correction is performed on the photographing module according to the grayscale correction coefficient of each pixel unit.

In this embodiment, a grayscale value is first set for the reference light source (that is, the reference high uniform surface light source), so as to project the exposure surface having the uniform irradiance value. Then image taking is performed on the reference light source by means of the photographing module, such that each pixel unit in the photosensitive chip can simultaneously receive light with the same energy. Flat-field correction of the photographing module is then completed according to output data of the photosensitive chip. For example, in this embodiment, global image taking is performed on the reference light source by means of the photographing module, that is, a uniform surface light source is greater than an image-taking surface range of the photographing module, such that the photosensitive chip in the photographing module may be completely covered by an image surface that is collected by an image-taking objective lens. For example, the preset grayscale value may be $2^n-1$; and if the grayscale of the 8-bit image is used, the preset grayscale value is 255.

Due to the influence of lens vignetting in the photographing module and photosensitive difference of the photosensitive chip in a camera, when the photographing module photographs the reference high uniform surface light source, there is a difference in sensed brightness between the center and the edge of the photosensitive chip, such that different grayscale displays are shown on the photographed image. Flat-field correction is to compare a grayscale value sensed by the photosensitive chip with a known reference high uniform surface light source. By using the grayscale of the 8-bit image as an example, the grayscale value of the reference light source is set to 255, such that a grayscale compensation value of each pixel of the photographing module may be obtained; after a compensation value correction module is used, the real distribution of the uniformity of the light source may be obtained by photographing the reference high uniform surface light source; and the flat-field correction is completed by the photographing module.

Further, in an embodiment, the operation of photographing the exposure surface of the reference light source by the photographing module, so as to obtain a reference light source image includes the following operations.

An image-taking surface of the photographing module is divided into several image-taking sub-regions on the basis of the size of the exposure surface of the reference light source.

The reference light source is moved, and the image-taking sub-regions are respectively projected to by the reference light source, so as to obtain several reference light source sub-images, wherein each reference light source sub-image corresponds to each image-taking sub-region.

The several reference light source sub-images are spliced, so as to obtain the reference light source image.

In the embodiment, the image-taking surface of the photographing module is divided according to an exposure size of the reference light source, such that the image-taking sub-regions obtained through division are projected to by moving the reference light source, so as to obtain the corresponding reference light source sub-images.

In the embodiment, a smaller-area surface light source with a uniform height is used as the reference light source; the length and width of the reference light source are respectively set to 1/p of the length of the image-taking surface and 1/q of the width of the image-taking surface; and the image-taking surface is conjugate with an imaging surface, that is, for the image-taking surface that is divided into p*q regions, p*q regions of the corresponding number on the imaging surface are mapped one by one, where p and q are both integers.

The reference light source corresponds to p*q regions of the imaging surface on the basis of the length and width of the reference light source.

The p*q regions are spliced into a uniform imaging surface region by region; and flat-field correction on the photographing module is completed by using the uniform imaging surface.

Figures 5, 6:
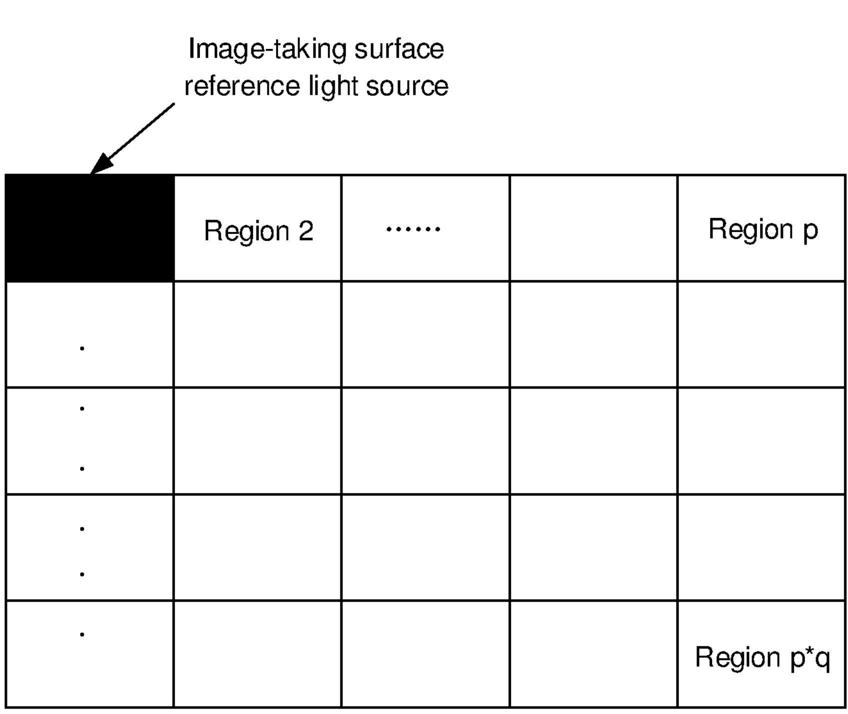
FIG. 5 is a schematic diagram of an example of a method for calibrating an exposure surface of an optical system according to an embodiment of the disclosure.
FIG. 6 is a schematic diagram of another example of a method for calibrating an exposure surface of an optical system according to an embodiment of the disclosure.

In combination with FIG. 5 and FIG. 6, FIG. 6 is obtained by conjugating FIG. 5. The reference light source is set in a region 1, and a corresponding imaging region is 1'. The reference light source is moved to a region 2, and the corresponding imaging region is 2'. The same reference light source is moved region by region, and the reference light source correspondingly images p*q regions; after region-by-region splicing, the uniform imaging surface covering the photosensitive chip may be generated on the imaging surface; and flat-field correction on the photographing module may be completed by using the imaging surface.

The optical system is an imaging system that can generate a clear image that is completely similar to an object. A beam in which all lights or extended lines thereof intersect at the same point is called a concentric beam. After the incident concentric beam passes through an ideal optical system, an emergent beam has to be the concentric beam. The intersection point of the incident concentric beams is called an object point, and the intersection point of the emergent concentric beams is called an image point. The ideal optical system has the following properties. 1. After all lights intersecting at the object point pass through the optical system, the emergent beams all intersect at the image point, and vice versa. This pair of points at which objects are interchangeable are called conjugate points. 2. Each straight line of an object side corresponding to a straight line of an image side is called a conjugate line; and a corresponding surface is called a conjugate surface. 3. For any plane perpendicular to an optic axis, the conjugate surface of the plane is still perpendicular to the optic axis. 4. For a pair of conjugate planes perpendicular to the optic axis, lateral magnification is a constant.

As at least one alternative embodiment, the projecting, by the reference light source, an exposure surface having a uniform irradiance value including:

the reference light source projects several exposure surfaces having a uniform irradiance value;

the photographing the exposure surface of the reference light source by the photographing module, so as to obtain a reference light source image including:

the photographing module photographs each exposure surface of the several exposure surfaces, so as to obtain several exposure surface images, and the several exposure surface images are processed to obtain the reference light source image.

In the embodiment, the reference light source may project two or more exposure surfaces respectively at different time, the two or more corresponding exposure surface images are obtained, and the obtained exposure surface images may be superimposed to obtain the reference light source image.

Each of the several exposure images has two kinds of grayscale regions, where the first grayscale region corresponds to the second grayscale region. Taking 8-bit images as an example, the first grayscale region may be a white region (i.e. 255 grayscale), and the second grayscale region may be a black region (i.e. 0 grayscale).

Wherein a first grayscale region of each exposure surface corresponds to a second grayscale region, overlapped to the first grayscale region, of remaining exposure surfaces. That is, the part of the second grayscale region of the remaining exposure surfaces are overlapped, and first grayscale region of each exposure surface corresponds to the overlapped second grayscale region.

For example, when the number of exposure surfaces is two, the number of the corresponding exposure surface image is also two, i.e., including the first exposure surface image and the second exposure surface image, wherein the first grayscale region of the first exposure surface image corresponds to the second grayscale region of the second exposure surface image; and the second grayscale region in the first exposure surface image corresponds to the first grayscale region in the second exposure surface image.

The first grayscale region in the first exposure surface image and the second grayscale region in the second exposure surface image are arranged at intervals; The first grayscale region in the second exposure surface image and the second grayscale region in the first exposure surface image are arranged at intervals. It should be noted that the "interval setting" here may refer to that the two do not overlap. For example, the two may be set next to each other, or there is a certain space interval when the first exposure surface image and the second exposure surface image are superimposed together.

The first grayscale region in the first exposure surface image is circular or square; and the first grayscale region in the second exposure surface image is circular or square. That is to say, the first exposure surface image and the second exposure surface image may be in a chessboard shape, or may be uniformly distributed dot charts. For example, the first exposure surface image and the second exposure surface image are dot charts, the first exposure surface image may include several light projection regions, and the light projection regions may be checks with the same size. Dots are arranged in the light projection regions; and the diameters of the dots may be set in advance. If there are white dots in any light projection region in the first exposure surface image, there are no white dots in a region adjacent to the light projection region. In the second exposure surface image, if there are no white dots in the light projection region, there are white dots in the region adjacent to the light projection region. The first exposure surface image and the second exposure surface image are superimposed, and the obtained images are images in which white dots exist in the light projection regions.

By projecting the exposure surface two or more times and obtaining two or more exposure surface images, the method can reduce the gray difference between the center and the edge, improve the accuracy of gray value extraction in the reference light source image, and thus improve the accuracy of flat-field correction.

Figure 3:
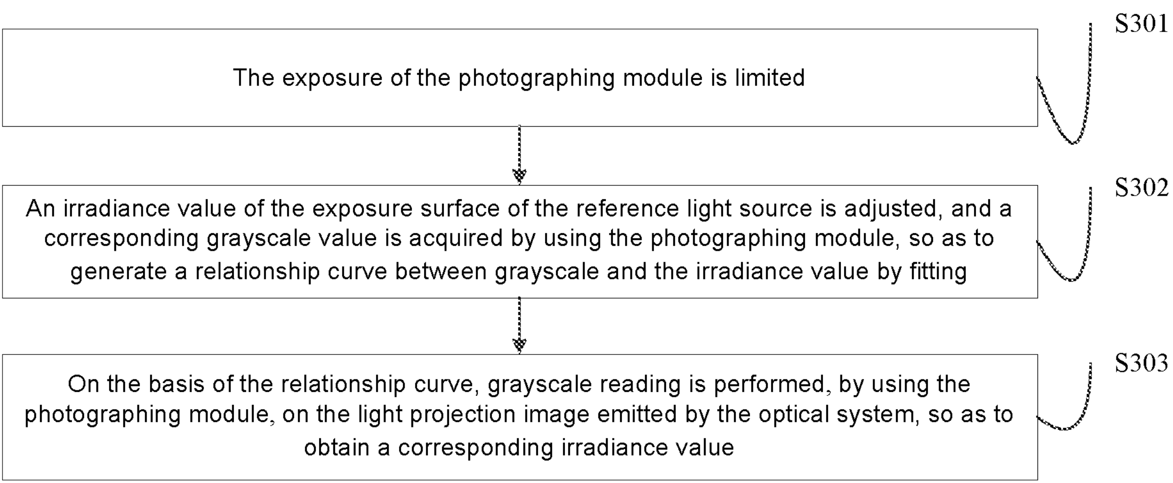
FIG. 3 is a schematic sub-flowchart of a method for calibrating an exposure surface of an optical system according to an embodiment of the disclosure.

In an embodiment, as shown in FIG. 3, the method for calibrating the exposure surface of the optical system may further include S301-S303.

At S301, the exposure of the photographing module is limited.

At S302, an irradiance value of the exposure surface of the reference light source is adjusted, and a corresponding grayscale value is acquired by using the photographing module, so as to generate a relationship curve between grayscale and the irradiance value by fitting.

At S303, on the basis of the relationship curve, grayscale reading is performed, by using the photographing module, on the light projection image emitted by the optical system, so as to obtain a corresponding irradiance value.

In this embodiment, in addition to calibrating the uniformity of a print exposure surface of a printer, the irradiance of the optical system may also be monitored, so as to learn an aging state of the optical system. For example, during flat-field correction, hardware parameters of the light projection image are first set; and the hardware parameters may include the exposure of a 3D printer, the gains of the photographing module, and an image processing condition, etc. Next, the exposure of the photographing module is fixed, and the fixed exposure keeps a grayscale peak of the light projection image below $2^n-1$ (the grayscale of the 8-bit image is 255).

Grayscale calibration is performed on the light projection image under the fixed exposure, so as to obtain a coordinate point of image-taking grayscale corresponding to the irradiance value. Then, different irradiance values may be measured by using an irradiance value measurement apparatus, so as to adjust the irradiance value of the light projection image; and the corresponding grayscale value is then acquired by means of the photographing module. After a plurality of times of adjustment, the coordinate point of the irradiance value may be fitted according to an adjustment result (that is, different irradiance values and the corresponding grayscale values), so as to generate the relationship curve between grayscale and the irradiance value. Subsequently, under the same exposure, when performing grayscale reading on the light projection image by the photographing module, the corresponding irradiance value according to the relationship curve may be determined.

As at least one alternative embodiment, the adjusting an irradiance value of an exposure surface of the reference light source, and acquiring a corresponding grayscale value by using the photographing module, so as to generate a relationship curve between grayscale and the irradiance value by fitting including:

the irradiance value of the exposure surface of the reference light source is adjusted, wherein the reference light source is exposed based on a spectral wavelength curve;

the exposure surface is photographed by the photographing module, so as to obtain a corresponding gray value, wherein the gray value is obtained based on the spectral wavelength curve and a photoelectric response function of the photographing module;

the relationship curve between the gray value and the irradiance value is obtained by fitting based on the irradiance value and the corresponding gray value.

In this way, the difference in photoelectric response caused by different spectral wavelengths of exposure at the reference light source can be controlled, thus improving the accuracy of gray reading and the irradiance value obtaining.

Further, the method for calibrating the exposure surface of the optical system may further include the following operations.

An irradiation control parameter and corresponding image information of the optical system are acquired.

A first relationship between the image information and irradiation data of the optical system is acquired.

A second relationship between the irradiation control parameter and the irradiation data of the optical system is obtained on the basis of the first relationship, the irradiation control parameter, and the corresponding image information. The second relationship is configured to adjust the irradiation data during 3D printing.

The irradiation control parameter is configured to adjust the irradiation data (such as irradiation brightness and optical power), for example, may be relevant parameter such as a current, or may be input brightness, an input voltage, an input electric power, etc. The image information is configured to reflect the features of an image, and may be embodied in a matrix form, for example, may be relevant parameter such as grayscale and brightness. The grayscale may be an average grayscale value of all pixels in a region, or is a median or a total value of all the pixels in the region. The irradiation data is configured to represent electromagnetic radiation related information of the light projection image, for example, may be parameters such as irradiation intensity, light intensity, illuminance, or optical power.

In an example, the maximum light projection area of the reference light source is not less than a light projection area of the optical system, so as to ensure that the position of corresponding mapping relationship can be found in each segmented region.

In the following, for example, the current is used as the irradiation control parameter, and the grayscale is used as the image information, acquiring the irradiation control parameter and corresponding image information of the optical system may use the following manners: inputting each preset current value into the optical system, and acquiring the grayscale value of the light projection image that is emitted by the optical system on the basis of each preset current value, so as to obtain a grayscale value corresponding to each preset current value.

The operation of acquiring the first relationship between the image information of the optical system and the irradiation data of the optical system may include: acquiring a third relationship between image information of the reference light source and the image information of the optical system, and a fourth relationship between the image information of the reference light source and the irradiation data of the reference light source; and obtaining the first relationship at least on the basis of the third relationship and the fourth relationship. The third relationship meets the image information of the reference light source being consistent with or deviating from the image information of the optical system.

For example, the third relationship may be acquired by using the following means: acquiring a fifth relationship between the grayscale of the optical system and the irradiation data of the optical system, and a sixth relationship between the grayscale of the reference light source and the irradiation data of the reference light source; and obtaining the third relationship between the grayscale of the reference light source and the grayscale of the optical system on the basis of the fifth relationship and the sixth relationship. The fourth relationship may be in the form of a mapping table, or may be in the form of a fitting curve, and is not specifically limited herein. For example, the image information is the grayscale value, by means of adjusting the irradiation data of the exposure surface of the reference light source, and using, under each piece of the irradiation data, the photographing module to acquire the corresponding grayscale value, any irradiation data and the grayscale value corresponding to the irradiation data may be obtained by using the photographing module, such that a relationship between the grayscale value of the reference light source and the irradiation data of the reference light source may be generated. It is to be noted that, the first relationship may not only be obtained on the basis of the third relationship and the fourth relationship, but also be obtained on the basis of the relationship between an initial irradiation control parameter of the optical system and the irradiation data of the optical system. Further, the first relationship may further be obtained on the basis of a relationship between other parameters of the optical system.

In an embodiment, the image information of the reference light source and the image information of the optical system may be considered to be the same. Therefore, the first relationship between the image information of the optical system and the irradiation data of the optical system may be obtained on the basis of the third relationship between the image information of the reference light source and the image information of the optical system, and the fourth relationship between the image information of the reference light source and the irradiation data of the reference light source.

In another embodiment, there is a deviation between the image information of the reference light source and the image information of the optical system. The deviation may be obtained by using the following manners: acquiring the relationship between the grayscale of the optical system and the irradiation data of the optical system, and the relationship between the grayscale of the reference light source and the irradiation data of the reference light source; and obtaining a seventh relationship between the grayscale of the reference light source and the grayscale of the optical system on the basis of the two relationships. The first relationship may be obtained on the basis of the seventh relationship, the third relationship, and the fourth relationship.

In order to further describe the exposure surface calibration method, further description is performed by using the image information as the grayscale and using the irradiation control parameter as the current.

1) The image information of the reference light source and the image information of the optical system may be considered to be the same.

The irradiance value of the exposure surface of the reference light source is adjusted, and the photographing module is used to acquire the corresponding grayscale value.

An eighth relationship between the grayscale value of the reference light source and the irradiance value of the reference light source is generated on the basis of the irradiance value and the corresponding grayscale value.

Each preset current value is inputted into the optical system, and the grayscale value of the light projection image that is emitted by the optical system on the basis of each preset current value is acquired, so as to obtain a grayscale value corresponding to each preset current value. The irradiation data of the exposure surface of the reference light source is adjusted, and the photographing module is used to acquire the corresponding grayscale value.

The corresponding grayscale value is processed by using the eighth relationship, so as to obtain the irradiation data corresponding to each preset current value.

Each preset current value and the irradiation data corresponding to each preset current value are processed, so as to obtain a ninth relationship between a current value of the optical system and the irradiation data of the optical system. The ninth relationship is configured to adjust the irradiation data during 3D printing.

The irradiation data may be one of irradiation intensity, power, light intensity, or other related values.

For example, by means of adjusting the irradiation data of the exposure surface of the reference light source, and using, under each piece of the irradiation data, the photographing module to acquire the corresponding grayscale value. That is, any irradiation data and the grayscale value corresponding to the irradiation data may be obtained by using the photographing module, such that the eighth relationship between the grayscale value and the irradiation data may be generated. The eighth relationship may be in the form of a mapping table, or may be in the form of a fitting curve, and is not specifically limited herein. Any one of fitting algorithms in the art may be used to fit the irradiation data and the corresponding grayscale value, for example, any one of a least square method, a polynomial fitting algorithm, or a cubic spline fitting algorithm. Each preset current value is inputted into the optical system; and the preset current values may be determined according to the optical system. In this solution, current values conveying to the optical system may be controlled by a host computer, and the magnitude of the current affects the irradiation data and grayscale of the light projection image. The optical system projects the light projection image with different grayscale values under each preset current value; and by using the photographing module to perform grayscale reading, the grayscale value of the light projection image that is projected by the optical system under each preset current value may be obtained. The irradiation data corresponding to each preset current value, and the ninth relationship between the irradiation data and the preset current value may be obtained according to the eighth relationship between the grayscale value and the irradiation data. The ninth relationship may be in the form of a mapping table, or may be in the form of a fitting curve, and is not specifically limited herein. The method of processing each preset current value and the irradiation data corresponding to each preset current value may be determined according to the form of the ninth relationship. In a specific example, the preset current values and the corresponding irradiation data may be fitted by means of the fitting algorithm, so as to obtain a fitting curve relationship between the preset current values and the irradiation data. After the ninth relationship is obtained, the ninth relationship may be used for 3D printing, and in this case, the irradiation data of the optical system is calibrated. In a specific example, before the irradiation data of the exposure surface of the reference light source is adjusted, the method further includes: limiting the exposure of the photographing module.

It is to be noted that, the irradiation data required for image of each layer during 3D printing may be different. Therefore, during printing, the irradiation data needs to be changed according to requirements. As the optical system being used, the irradiation data of the light projection image under the same current is changed, such that the irradiation data of the optical system needs to be calibrated. In traditional technologies, an optical power meter is usually used to manually collect the irradiation data point by point. When large-format printing is required, the sampling of the irradiation data usually needs to be performed for a long time, such that the efficiency is low, and the optical power meter with a high cost needs to be used. For the optical uniformity calibration and calibrating the irradiation data performed on the optical system in the disclosure, the optical system can be automatically and rapidly calibrated without the optical power meter, and manpower costs are also saved.

2) There may be a deviation between the image information of the reference light source and the image information of the optical system.

A tenth relationship between the grayscale of the optical system and the irradiation data of the optical system, and an eleventh relationship between the grayscale of the reference light source and the irradiation data of the reference light source are acquired.

A twelfth relationship between the grayscale of the reference light source and the grayscale of the optical system is obtained on the basis of the tenth relationship and the eleventh relationship.

Each preset current value is inputted into the optical system, and grayscale reading is performed on the light projection image that is emitted by the optical system on the basis of each preset current value, so as to obtain the grayscale value corresponding to each preset current value.

A compensation grayscale value of the reference light source is obtained by using the twelfth relationship to process the corresponding grayscale values.

The compensation grayscale values are processed by using the tenth relationship, so as to obtain the irradiation data corresponding to each preset current value.

Each preset current value and the corresponding irradiation data are processed, so as to obtain a thirteenth relationship between the current value of the optical system and the irradiation data of the optical system. The thirteenth relationship is configured to adjust the irradiation data during 3D printing.

The irradiation data may be one of irradiation intensity, power, or other related values.

For example, the tenth relationship and the eleventh relationship may be measured and stored in a storage unit in advance, may be directly called when needing to be used, or may be obtained by using the method for acquiring the eighth relationship. For example, the tenth relationship is a fitting curve relationship, the grayscale value of the optical system and the irradiation data of the optical system may be measured before the optical system leaves the factory and stored in the storage unit; and the grayscale value and the irradiation data are fitted by means of the fitting algorithm, so as to obtain the tenth relationship. After the tenth relationship and the eleventh relationship are determined, the relationship between the grayscale value of the reference light source and the grayscale value of the optical system may be obtained. The optical system projects the light projection image with different grayscale values under each preset current value; and by using the photographing module to perform grayscale reading, the grayscale value of the light projection image that is projected by the optical system under each preset current value may be obtained. The optical system projects the light projection image with different grayscale values under each preset current value; and by using the photographing module to perform grayscale reading, the corresponding grayscale values in the optical system are obtained. The compensation grayscale value in the reference light source may be obtained according to the twelfth relationship and the grayscale value corresponding to the optical system; and the irradiation data corresponding to each preset current value is further determined on the basis of the eleventh relationship. Therefore, the irradiation data corresponding to each preset current value may be obtained. The thirteenth relationship may be obtained on the basis of the irradiation data corresponding to each preset current value. It is to be noted that, the tenth relationship, the eleventh relationship, the twelfth relationship, and the thirteenth relationship may all use the form of a mapping table or the relationship of the fitting curve. After the sixth relationship is obtained, the sixth relationship may be used for 3D printing, and in this case, the irradiation data of the optical system is calibrated. By means of the method, by acquiring the relationship between the grayscale of the reference light source and the grayscale of the optical system, the difference between the grayscale of the reference light source and the grayscale of the optical system under the unified irradiation data is solved, such that the accuracy of calibration of the irradiation data can be further improved.

In an embodiment, S301 and S302 may be performed during flat-field correction.

In an embodiment, S202 may include the following operation.

The exposure of the photographing module is adjusted, so as to cause the grayscale values of the grayscale distribution image obtained through photographing to be below a maximum grayscale value. The maximum grayscale value is $2^n-1$, where n is an image bit; and the maximum grayscale value in the 8-bit image is 255.

In this embodiment, the imaging surface is photographed by the photographing module after flat-field correction. By adjusting the exposure of the photographing module, the grayscale value of the entire photographed imaging surface is below the maximum grayscale value (if the grayscale displayed by a grayscale image is 0-255, the maximum grayscale value is 255), such that the real uniformity distribution of the imaging surface may be obtained, that is, a corresponding pixel-level grayscale distribution image.

In another embodiment, S202 may include the following operation.

The operation of acquiring the grayscale distribution image generated by photographing the exposure surface of the optical system by the photographing module includes the following operations.

A first grayscale distribution image and a second grayscale distribution image are acquired. The first grayscale distribution image is obtained by photographing a first image that is projected by the optical system, the second grayscale distribution image is obtained by photographing a second image that is projected by the optical system, a first grayscale region in the first image corresponds to a second grayscale region in the second image, and a second grayscale region in the first image corresponds to a first grayscale region in the second image.

The first grayscale distribution image and the second grayscale distribution image are processed, so as to obtain the grayscale distribution image.

The first grayscale region corresponds to the second grayscale region in grayscale. By using the 8-bit image as an example, the first grayscale region may be a white region (that is, 255 grayscale), and the second grayscale region may be a black region (that is, 0 grayscale).

For example, the white region in the first image corresponds to the black region in the second image. That is to say, any position in the first image is the white region, and the corresponding position in the second image is the black region. The black region in the first image corresponds to the white region in the second image. That is to say, any position in the first image is the black region, and the corresponding position in the second image is the white region. The first image is photographed by the photographing module, and the first grayscale distribution image is obtained; and the second image is photographed by the photographing module, and the second grayscale distribution image is obtained. The grayscale distribution image generated by photographing the exposure surface of the optical system may be obtained by superimposing the first grayscale distribution image and the second grayscale distribution image.

In the method, by means of performing image projection for two times and obtaining the first grayscale distribution image and the second grayscale distribution image, a grayscale difference between a center and an edge can be reduced, thereby improving the accuracy of the grayscale value in the grayscale distribution image.

The first grayscale region in the first image and the second grayscale region in the first image are arranged at intervals; the first grayscale region in the second image and the second grayscale region in the first image are arranged at intervals; It should be noted that the “interval arrangement” here refers to that the two do not overlap. For example, the two can be set next to each other or there is a certain space interval when the first exposure surface image and the second exposure surface image are superimposed together. The first grayscale region in the first image is circular or square; and the first grayscale region in the second image is circular or square. That is to say, the first image and the second image may be in a chessboard shape, or may be uniformly distributed dot charts. For example, the first image and the second image are dot charts, the first image may include several light projection regions, and the light projection regions may be checks with the same size. Dots are arranged in the light projection regions; and the diameters of the dots may be set in advance.

If there are white dots in any light projection region in the first image, there are no white dots in a region adjacent to the light projection region. In the second image, if there are no white dots in the light projection region, there are white dots in the region adjacent to the light projection region.

The first image and the second image are superimposed, and the obtained images are images in which white dots exist in the light projection regions.

In an embodiment, a lens of the photographing module is provided with an optical filter, which is configured to filter the influence of ambient light on the photographing module.

In an embodiment, a fitting algorithm is used to calculate the fitting grayscale value of each segmented region; and the fitting algorithm is a least square method, a polynomial fitting algorithm, or a cubic spline fitting algorithm.

In this embodiment, the fitting algorithm is used to calculate the fitting grayscale value of each segmented region; and a least square method, a polynomial fitting algorithm, or a cubic spline fitting algorithm, or other fitting algorithms may be used.

When the grayscale distribution image is segmented into a mesh image including a plurality of segmented regions, m lines and n columns may be specifically segmented, so as to form m*n mesh distribution.

Figure 4:
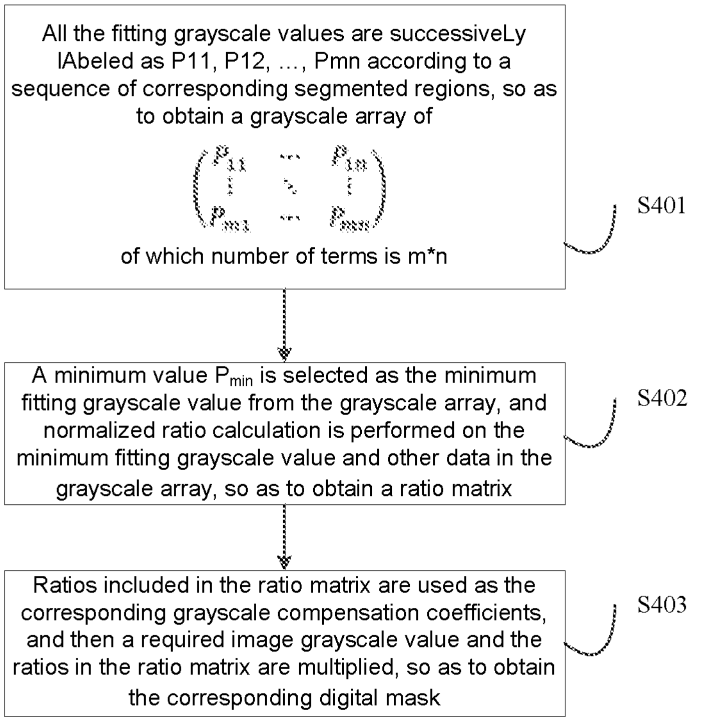
FIG. 4 is another schematic flowchart of a method for calibrating an exposure surface of an optical system according to an embodiment of the disclosure.

In an embodiment, as shown in FIG. 4, S204 may include S401-S403.

At S401, all the fitting grayscale values are successively labeled as $P_{11}$, $P_{12}$, . . . , $P_{mn}$ according of corresponding segmented regions, so as to obtain a grayscale array of $$\begin{pmatrix} P_{11} & \dots & P_{1n} \\ \vdots & \ddots & \vdots \\ P_{m1} & \dots & P_{mn} \end{pmatrix}$$

of which number of terms is m*n.

At S402, a minimum value $P_{min}$ is selected as the minimum fitting grayscale value from the grayscale array, and normalized ratio calculation is performed on the minimum fitting grayscale value and other data in the grayscale array, so as to obtain a ratio matrix.

At S403, ratios included in the ratio matrix are used as the corresponding grayscale compensation coefficients, and then a required image grayscale value and the ratios in the ratio matrix are multiplied, so as to obtain the corresponding digital mask.

In this embodiment, a minimum grayscale fitting value in the mesh image is selected as a reference, and is compared with other fitting grayscale values, so as to obtain the grayscale compensation coefficients. The grayscale compensation coefficients in the mesh image may for the digital mask; and after mask compensation of the digital mask is performed on each light projection image, the printed image of which the exposure surface has the uniform irradiance value may be obtained.

For example, the fitting grayscale value of a first mesh in the mesh image is set as $P_{min}$ and so on, the fitting grayscale value of a last mesh is set as $P_{mn}$, such that the grayscale array of $$\begin{pmatrix} P_{11} & \dots & P_{1n} \\ \vdots & \ddots & \vdots \\ P_{m1} & \dots & P_{mn} \end{pmatrix}$$

of which number of terms is m*n may be obtained. The minimum value $P_{min}$ in the grayscale array is selected, and is subjected to normalized ratio $$:P_{\min}/\begin{pmatrix} P_{11} & \dots & P_{1n} \\ \vdots & \ddots & \vdots \\ P_{m1} & \dots & P_{mn} \end{pmatrix}$$

with other fitting grayscale values in the grayscale array, so as to generate the corresponding ratio matrix. The ratios in the ratio matrix are the compensation coefficients. A required image grayscale value is a grayscale value of an image that needs to be projected by a user; and when the set required image grayscale value is a, the a and the ratio matrix are multiplied, so as to obtain the digital mask.

In some other embodiments of the disclosure, further disclosed is a calibration measurement method for 3D printing. In addition to calibrating the exposure surface of the optical system by using the method for calibrating the exposure surface of the optical system in some implementations of the disclosure, the calibration measurement method further includes a plurality of measurement steps. By measuring a plurality of parameters of the optical system, it may be determined that the parameters of the optical system meet requirements during 3D printing, such that a clear image that is completely similar to an object can be generated, thereby realizing more accurate and efficient 3D printing.

Figures 7, 8:
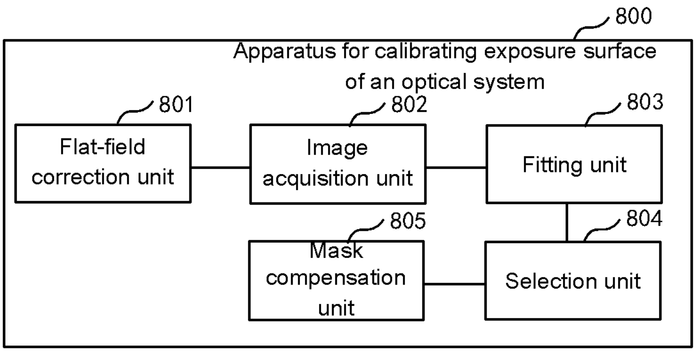
FIG. 7 is a schematic flowchart of a calibration measurement method for 3D printing according to an embodiment of the disclosure.
FIG. 8 is a schematic block diagram of an apparatus for calibrating an exposure surface of an optical system according to an embodiment of the disclosure.

Details are described below in combination with FIG. 7. FIG. 7 is a schematic flowchart of a calibration measurement method for 3D printing according to an embodiment of the disclosure. The calibration measurement method for 3D printing may include: calibrating the exposure surface of the optical system by using the exposure surface calibration method 100 for an optical system according to some implementation of the disclosure; and executing S701 to S705 of the calibration measurement method. The exposure surface calibration method 100 for an optical system according to some implementation of the disclosure refers to details shown in FIG. 1 to FIG. 6. For simplicity, details are not described herein again. S701 to S705 of the calibration measurement method is specifically described.

At S701, a static contrast ratio and a dynamic contrast ratio of the optical system are measured; the above irradiance value testing method is used to respectively extract an irradiance value of each sampling point in a contrast ratio image; and calculated numerical values are outputted according to the method for calculating the static contrast ratio and the dynamic contrast ratio.

At S702, the clarity of the optical system is measured; image taking is performed, by a camera module, on a resolution test image displayed by an exposure system; and Contrast Transfer Function (CTF) and Modulation Transfer Function (MTF) image algorithms are used to calculate the numerical value of a spatial resolution required, so as to determine the clarity of the exposure system. For an exposure lens with an electric focusing system, focusing adjustment feedback may further be performed.

At S703, whether there is dirt on an optical machine device is detected; the camera module uses the above steps to extract grayscale distribution of the exposure surface; and according to continuous distribution of grayscale, if the grayscale of a region is mutated and is less than a preset threshold, it is determined that there is dirt in the region.

At S704, the size of an exposure surface image is measured. The camera module calibrates by using different heights; and according to the principle that the amplification ratio of different object distances is constant, the size and relative distribution of various images of the exposure surface may be tested.

It is to be understood that, the sequence of S701 to S705 is merely exemplary, and these steps may be executed in a different sequence to measure various parameters, and the disclosure is not limited thereto.

For example, in S701, measuring the static contrast ratio and the dynamic contrast ratio of the optical system specifically includes the following steps: acquiring a first irradiance value corresponding to a white image and a second irradiance value corresponding to a black image, where the white image and the black image are both obtained through projection of the calibrated optical system.

The static contrast ratio of the optical system is obtained according to the first irradiance value and the second irradiance value.

An irradiance value of each region in a chessboard map is acquired; and the chessboard map is obtained through projection of the calibrated optical system.

The irradiance value of each region is processed by using an ANSI contrast calculation method, so as to obtain a dynamic contrast ratio of the optical system.

In some embodiments, the static contrast ratio may be measured on the basis of the exposure surface calibration technology of the disclosure. The method specifically includes the following steps. First, a light guiding film is used on the exposure surface to receive a full-format white image that is projected or displayed by the optical system, that is, the light projection image; a $2^n-1$ full-range white image in a n-bit image is set to be used; and using an 8-bit image as an example, 255 full-range white image in 0-255 grayscale may be set. An irradiance value measurement apparatus of the optical system is used to measure the irradiance value of the pure white image, so as to obtain the first irradiance value. Then, the light guiding film is used on the exposure surface to receive a full-format pure black image that is projected or displayed by the optical system, that is, the light projection image; and a 0-range pure black image is set to be used. The irradiance value measurement apparatus of the optical system is used to measure the irradiance value of the pure black image, so as to obtain the second irradiance value. Then, the static contrast ratio of the optical system is calculated according to the first irradiance value and the second irradiance value by the irradiance value measurement apparatus.

In some embodiments, the dynamic contrast ratio may be measured on the basis of the exposure surface calibration technology of the disclosure. The method specifically includes the following steps. First, the light guiding film is used on the exposure surface to receive the chessboard map that is projected or displayed by the optical system; and the irradiance value measurement apparatus of the optical system is used to successively measure the irradiance value at each point of the chessboard map, so as to obtain the irradiance value at each point of the chessboard map. Then, the irradiance value measurement apparatus calculates the numerical value of the dynamic contrast ratio of the optical system by using an ANSI contrast calculation method. In this embodiment, the measurement of the irradiance value is realized in a manner of machine vision.

In some implementations, the irradiance value is acquired on the basis of the exposure surface calibration technology provided in the disclosure. The method specifically includes the following steps. First, grayscale calibration is performed on the light projection image under the fixed exposure, so as to obtain a coordinate point of image-taking grayscale corresponding to the irradiance value; after an output irradiance value of an irradiation device is changed, the irradiance value measurement apparatus is used to measure different irradiance values; then the grayscale value of the image is acquired by using an image-taking module; different irradiance values are measured for a plurality of times, and then the coordinate point is fitted; and a grayscale/irradiance value curve is generated according to the fitted coordinate point. Therefore, grayscale reading is performed on the light projection image by the image-taking module under the same exposure, the grayscale value may be converted into the corresponding irradiance value.

In S702, measuring the clarity of the light projection image specifically includes the following steps: controlling the calibrated optical system to project an image to a preset position on a light projection format, where the image includes at least one line in a sagittal direction and at least one line in a meridian direction; acquiring an actual grayscale distribution curve of the projected image, and confirming a CTF value or an MTF value corresponding to each preset position according to the actual grayscale distribution curve and a preset grayscale distribution curve; and determining the clarity of the optical system according to the CTF value or the MTF value corresponding to each preset position.

The preset position may include a central position and four corner positions of a light projection format. The CTF value may be calculated by using common means in the art. The MTF value may also be calculated by using common means in the art.

For example, the step of determining the clarity of the optical system according to the CTF value or the MTF value corresponding to each preset position includes: if any CTF value is less than a first set value, or any MTF value is less than a second set value, determining that the clarity of the optical system is unqualified. The clarity is determined according to the CTF value; and if the calculated CTF value is less than the set value, it is determined that the point is unclear. The clarity may also be determined according to the MTF value; and if the calculated MTF value is less than the set value, it is determined that the point is unclear. If there are unclear points, it is considered that the clarity of a lens of the optical machine device is poor. Further, when there are a plurality of lines in the sagittal direction, and there are a plurality of lines in the meridian direction, the spacing between the lines in the sagittal direction may be N pixels, which are configured to determine whether the meridian direction is ambiguous. The spacing between the lines in the meridian direction may be N pixels, which are configured to determine whether the sagittal direction is ambiguous. The width of the line may be N pixels, where N is a positive integer.

In S703, detecting whether there is dirt on the optical machine device specifically includes: if the value of any point on the actual grayscale distribution curve is lower than a lower limiting value, and/or there is a mutation curve in the actual grayscale distribution curve, determining that there is dirt on the optical system.

In some implementations, the optical system of the disclosure performs dirt detection by means of the following steps. By setting the lower limiting value of grayscale distribution, the grayscale distribution of the optical machine device is generally continuously changed in a format. If actual grayscale is lower than the lower limiting value and/or there is a mutation in the actual grayscale distribution curve of the optical machine device, it is considered that dirt exists.

In S704, measuring the size of a photographed object specifically includes: calibrating a size corresponding to each pixel on a photographing surface in a camera module, and determining the size of a photographed object according to the number of the pixels that are occupied by a side length of the photographed object. And/Or, The size of the photographing surface in the camera module is acquired, and the size of the photographed object is determined according to the ratio of the photographing surface occupied by the side length of the photographed object.

For example, a size measurement apparatus of the optical system in the disclosure performs size measurement by using the following method. In some implementations, a size corresponding to each pixel on a photographing surface in a camera is calibrated in advance, and the size of an object is then determined by using the size measurement apparatus of the optical system according to the number of the pixels that are occupied by a side length of the photographed object. In some other implementations, the size of the photographing surface in the camera is acquired; and the size of the object is determined by using the size measurement apparatus of the optical system according to the ratio of the photographing surface occupied by the side length of the photographed object.

In some implementations, the optical system of the disclosure needs to use different camera modules in different test items. The optical system of the disclosure can select the corresponding camera modules for different test items and execute corresponding test flows, so as to realize automatic testing. That is to say, the current test item is determined, the corresponding camera module is selected according to the current test item, and then S701 to S704 are executed.

FIG. 8 is a schematic block diagram of an exposure surface calibration apparatus 800 for an optical system according to this embodiment. The apparatus 800 includes an image acquisition unit, a fitting unit, a selection unit, and a mask compensation unit.

The image acquisition unit 802 is configured to acquire a grayscale distribution image generated by photographing an exposure surface of an optical system by a photographing module.

The fitting unit 803 is configured to segment the grayscale distribution image into a mesh image comprising a plurality of segmented regions, and calculate a fitting grayscale value of each segmented region.

The selection unit 804 is configured to select, as a reference grayscale value, a minimum fitting grayscale value from all the fitting grayscale values obtained through calculation, and calculate, according to the reference grayscale value, grayscale compensation coefficients corresponding to the other segmented regions, so as to generate a digital mask.

The mask compensation unit 805 is configured to perform mask compensation, by using the digital mask, on a light projection image emitted by the optical system, so as to obtain a printed image of which the exposure surface has a uniform irradiance value.

In an embodiment, the apparatus 800 further includes a flat-field correction unit 801. The flat-field correction unit is configured to perform flat-field correction on a photographing module by using a reference light source.

In an embodiment, the flat-field correction unit 801 may include a projection unit, an exposure surface photographing unit, a data acquisition unit, and a coefficient correction unit.

The projection unit is configured to project, by the reference light source, an exposure surface having a uniform irradiance value according to a preset grayscale value.

The exposure surface photographing unit is configured to photograph the exposure surface of the reference light source by the photographing module, so as to obtain a reference light source image.

The data acquisition unit is configured to acquire a grayscale output value of each pixel unit in a photosensitive chip according to the reference light source image, and compare a preset grayscale value of the reference light source with the grayscale output value of each pixel unit, so as to obtain a grayscale correction coefficient of each pixel unit.

The coefficient correction unit is configured to perform flat-field correction on the photographing module according to the grayscale correction coefficient of each pixel unit.

In an embodiment, the exposure surface photographing unit may include an image-taking surface division unit, a movable projection unit, and an image splicing unit.

The image-taking surface division unit is configured to divide an image-taking surface of the photographing module into several image-taking sub-regions on the basis of the size of the exposure surface of the reference light source.

The movable projection unit is configured to move the reference light source, and respectively project the image-taking sub-regions by the reference light source, so as to obtain several reference light source sub-images corresponding to the image-taking sub-regions.

The image splicing unit is configured to splice the several reference light source sub-images, so as to obtain the reference light source image.

Figure 9:
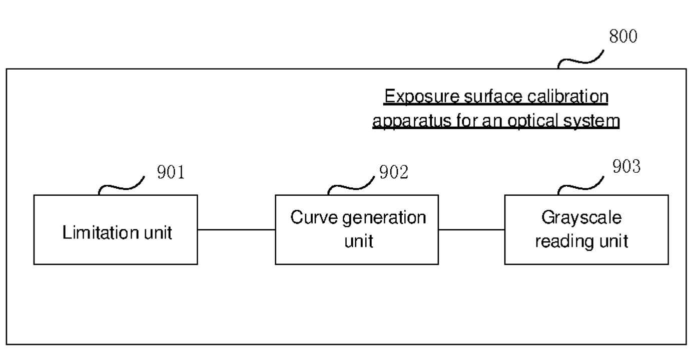
FIG. 9 is a sub schematic block diagram of an apparatus for calibrating an exposure surface of an optical system according to an embodiment of the disclosure.

In an embodiment, as shown in FIG. 9, the exposure surface calibration apparatus 800 for an optical system further includes a limitation unit, a curve generation unit, and a grayscale reading unit.

The limitation unit 901 is configured to limit the exposure of the photographing module.

The curve generation unit 902 is configured to adjust an irradiance value of the exposure surface of the reference light source, and acquire a corresponding grayscale value by using the photographing module, so as to fit to generate a relationship curve between grayscale and the irradiance value.

The grayscale reading unit 903 is configured to, on the basis of the relationship curve, perform grayscale reading by using the photographing module on the light projection image emitted by the optical system, so as to obtain the corresponding irradiance value.

In an embodiment, the image acquisition unit 802 may include an adjustment unit.

The adjustment unit is configured to adjust the exposure of the photographing module, so as to cause the grayscale distribution image obtained through photographing to be below a maximum grayscale value.

In an embodiment, a fitting algorithm is used to calculate the fitting grayscale value of each segmented region; and the fitting algorithm is a least square method, a polynomial fitting algorithm, or a cubic spline fitting algorithm.

Figure 10:
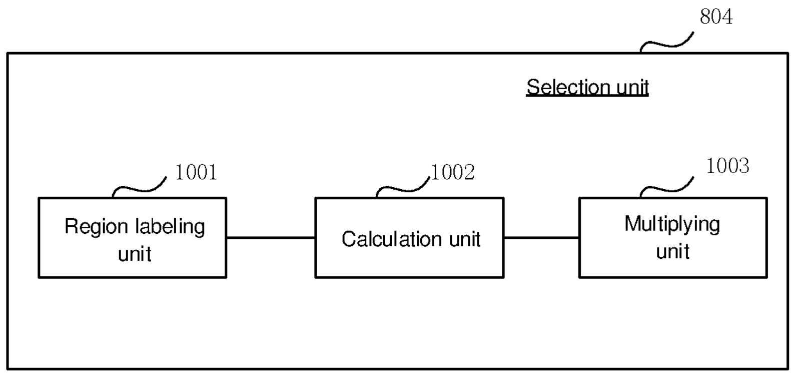
FIG. 10 is another schematic block diagram of an apparatus for calibrating an exposure surface of an optical system according to an embodiment of the disclosure.

In an embodiment, as shown in FIG. 10, the selection unit 804 may include a region labeling unit, a calculation unit, and a multiplying unit.

The region labeling unit 1001 is configured to successively label all the fitting grayscale values as $P_{11}$, $P_{12}$, . . . , $P_{mn}$ according to a sequence of corresponding segmented regions, so as to obtain a grayscale array of $$\begin{pmatrix} P_{11} & \dots & P_{1n} \\ \vdots & \ddots & \vdots \\ P_{m1} & \dots & P_{mn} \end{pmatrix}$$

of which number of terms is m*n.

The calculation unit 1002 is configured to select, as the minimum fitting grayscale value, a minimum value $P_{min}$ from the grayscale array, and perform normalized ratio calculation on the minimum fitting grayscale value and other data in the grayscale array, so as to obtain a ratio matrix.

The multiplying unit 1003 is configured to use ratios included in the ratio matrix as the corresponding grayscale compensation coefficients, and then multiply a preset image grayscale value and the ratios in the ratio matrix, so as to obtain the corresponding digital mask.

As described above, the optical system of the disclosure is an imaging system that can generate a clear image that is completely similar to an object. In some implementations, the optical system of the disclosure may further include one or more additional apparatuses to perform a plurality of measurement steps. By measuring a plurality of parameters of the optical system, it may be determined that the parameters of the optical system meet requirements during 3D printing, such that a clear image that is completely similar to an object can be generated, thereby realizing more accurate and efficient 3D printing.

Figure 11:
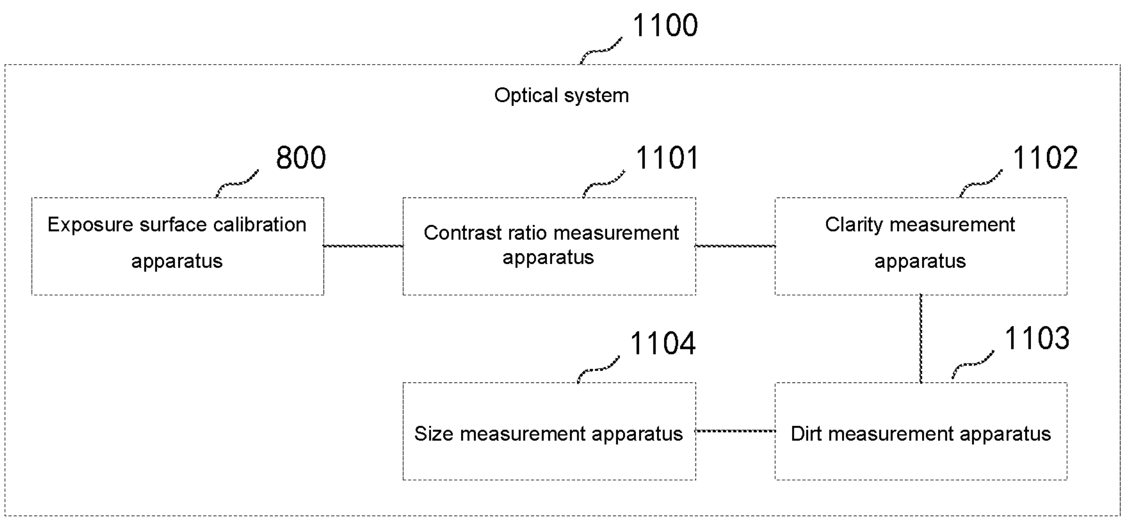
FIG. 11 is a schematic block diagram of an optical system according to an embodiment of the disclosure.

Details are described below in combination with FIG. 11. FIG. 11 is a schematic block diagram of an optical system according to an embodiment of the disclosure. In addition to the exposure surface calibration apparatus 800 described in FIG. 8, the optical system 1100 further includes a contrast ratio measurement apparatus, a clarity measurement apparatus, a dirt measurement apparatus, and a size measurement apparatus.

The contrast ratio measurement apparatus 1101 is configured to measure a static contrast ratio and a dynamic contrast ratio of the optical system.

The clarity measurement apparatus 1102 is configured to measure the clarity of a projection image.

The dirt measurement apparatus 1103 is configured to detect whether there is dirt on an optical machine device.

The size measurement apparatus 1104 is configured to measure the size of a photographed object.

The optical system of the disclosure can measure the static contrast ratio and the dynamic contrast ratio of the optical system by means of the contrast ratio measurement apparatus 1101.

The contrast ratio measurement apparatus 1101 may be configured to acquire a first irradiance value corresponding to a white image and a second irradiance value corresponding to a black image, where the white image and the black image are both obtained through projection of the calibrated optical system; obtain a static contrast ratio of the optical system according to the first irradiance value and the second irradiance value; acquire an irradiance value of each region in a chessboard map, where the chessboard map is obtained through projection of the calibrated optical system; and process the irradiance value of each region by using an ANSI contrast calculation method, so as to obtain a dynamic contrast ratio of the optical system.

In some implementations, the optical system of the disclosure further includes the clarity measurement apparatus 1102. The clarity measurement apparatus 1102 is configured to measure the clarity of the optical system.

The clarity measurement apparatus 1102 may be configured to control the calibrated optical system to project an image to a preset position on alight projection format, where the image includes at least one line in a sagittal direction and at least one line in a meridian direction; acquire an actual grayscale distribution curve of the projected image, and confirm a CTF value corresponding to each preset position according to the actual grayscale distribution curve and a preset grayscale distribution curve; and determine the clarity of the optical system according to the CTF value corresponding to each preset position. The clarity measurement apparatus is further configured to, if any CTF value is less than a set value, determine that the clarity of the optical system is unqualified.

In some implementations, the optical system of the disclosure further includes the dirt measurement apparatus 1103. The dirt measurement apparatus 1103 can detect whether there is dirt on the optical machine device.

The dirt measurement apparatus 1103 is configured to, if the value of any point on the actual grayscale distribution curve is lower than a lower limiting value, and/or there is a mutation curve in the actual grayscale distribution curve, determine that there is dirt on the optical system.

In some implementations, the optical system of the disclosure further includes the size measurement apparatus 1104. The size measurement apparatus 1104 is configured to measure the size of an object, so as to achieve more accurate 3D printing.

The size measurement apparatus 1104 is configured to calibrate a size corresponding to each pixel on a photographing surface in a camera module, and determine the size of a photographed object according to the number of the pixels that are occupied by a side length of the photographed object; and/or acquire the size of the photographing surface in the camera module, and determine the size of the photographed object according to the ratio of the photographing surface occupied by the side length of the photographed object.

In some implementations, the optical system of the disclosure executes different test items by means of the contrast ratio measurement apparatus 1101, the clarity measurement apparatus 1102, the dirt measurement apparatus 1103, and/or the size measurement apparatus 1104. Different camera modules need to be used in different test items. The optical system of the disclosure can select the corresponding camera modules for different test items and execute corresponding test flows, so as to realize automatic testing.

Since the embodiments of the apparatus portion and the embodiments of the method portion correspond to each other, for the embodiments of the apparatus portion, refer to the description of the embodiments of the method portion, and details are not described herein again temporarily.

An embodiment of the disclosure further provides a computer-readable storage medium. The computer-readable storage medium stores a computer program. Steps provided in the above embodiments are implemented when the computer program is executed. The storage medium may include: various media capable of storing program codes such as a U disk, a mobile Hard Disk Drive (HDD), a Read-Only Memory (ROM), a Random Access Memory (RAM), a magnetic disk or an optical disk.

An embodiment of the disclosure further provides a computer device. The computer device may include a memory and a processor. The memory stores a computer program; and when the processor calls the computer program in the memory, steps provided in the above embodiments may be implemented. Definitely, the computer device may further include components such as various network interfaces and power supplies.

The optical system of the disclosure is preferably an optical system of a 3D printer, including a Digital Light Processing (DLP) optical machine device, or an optical machine device including Liquid Crystal Display (LCD), or an optical machine device including Liquid Crystal on Silicon (LCOS), or optical machine devices including an Organic Light-Emitting Diode (OLED), a Micro-LED, a Mini-LED, and liquid crystal projection.

Each embodiment in this specification is described in a progressive manner, and each embodiment focuses on the differences from other embodiments, and the same or similar parts of each embodiment may be referred to each other. For the system disclosed in the embodiments, since the apparatus corresponds to the method disclosed in the embodiments, the description is relatively simple, and for related parts, refer to the partial descriptions of the method. It should be noted that for a person of ordinary skill in the art, without departing from the principles of the disclosure, several improvements and modifications may be made to the disclosure, which also fall within the scope of protection of the claims of the disclosure.

It is also to be noted that relational terms such as first and second are used merely to distinguish one entity or operation from another entity or operation herein, and do not necessarily require or imply the existence of any such actual relationship or order between these entities or operations. Furthermore, terms “comprise”, “include” or any other variants are intended to encompass non-exclusive inclusion, such that a process, a method, an article or a device including a series of elements not only include those elements, but also includes other elements not listed explicitly or includes intrinsic elements for the process, the method, the article, or the device. Without any further limitation, an element defined by the phrase “comprising one” does not exclude existence of other same elements in the process, the method, the article, or the device that includes the elements.

INDUSTRIAL APPLICABILITY

The disclosure provides the method and apparatus for calibrating the exposure surface of an optical system, and the computer device and the storage medium. The method includes: performing flat-field correction on the photographing module by using the reference light source; acquiring the grayscale distribution image generated by photographing the exposure surface of the optical system by the photographing module; segmenting the grayscale distribution image into the mesh image including the plurality of segmented regions, and calculating the fitting grayscale value of each segmented region; selecting, as the reference grayscale value, the minimum fitting grayscale value from all the fitting grayscale values obtained through calculation, and calculating, according to the reference grayscale value, the grayscale compensation coefficients corresponding to the other segmented regions, so as to generate the digital mask; and using the digital mask to perform mask compensation on the light projection image emitted by the optical system, so as to obtain the printed image of which the exposure surface has the uniform irradiance value. In the disclosure, by acquiring the pixel-level distribution of an exposure surface, and performing corresponding compensation on a grayscale value, the calibration accuracy and calibration efficiency of the exposure surface of an optical system may be improved. Further disclosed in the disclosure further is a calibration measurement method for 3D printing. According to the calibration measurement method for 3D printing, by measuring a plurality of parameters of the optical system, it may be determined that the parameters of the optical system meet requirements during 3D printing, such that a clear image that is completely similar to an object can be generated, thereby realizing more accurate and efficient 3D printing.

In addition, it is understandable that, the exposure surface calibration method and apparatus for an optical system, the calibration measurement method and apparatus, and the computer device and the storage medium of the disclosure may be reproduced, and may be used in a variety of industrial applications. For example, the exposure surface calibration method and apparatus for an optical system, the calibration measurement method and apparatus, and the computer device and the storage medium of the disclosure may be applied in the technical field of optical systems.

What is claimed is:

1. A method for calibrating an exposure surface of an optical system, comprising:

performing flat-field correction on a photographing module by using a reference light source;

acquiring a grayscale distribution image generated by photographing an exposure surface of an optical system by the photographing module;

segmenting the grayscale distribution image into a mesh image comprising a plurality of segmented regions, and calculating a fitting grayscale value of each segmented region;

selecting, as a reference grayscale value, a minimum fitting grayscale value from all the fitting grayscale values obtained through calculation, and calculating, according to the reference grayscale value, grayscale compensation coefficients corresponding to the other segmented regions, so as to generate a digital mask; and performing mask compensation, by using the digital mask, on a light projection image emitted by the optical system, so as to obtain a printed image of which the exposure surface has a uniform irradiance value.

2. The method for calibrating the exposure surface of the optical system as claimed in claim 1, wherein acquiring the grayscale distribution image generated by photographing the exposure surface of the optical system by the photographing module comprises:

acquiring a first grayscale distribution image and a second grayscale distribution image, wherein the first grayscale distribution image is obtained by photographing a first image that is projected by the optical system, the second grayscale distribution image is obtained by photographing a second image that is projected by the optical system, a first grayscale region in the first image corresponds to a second grayscale region in the second image, and a second grayscale region in the first image corresponds to a first grayscale region in the second image; and processing the first grayscale distribution image and the second grayscale distribution image, so as to obtain the grayscale distribution image.

3. The method for calibrating the exposure surface of the optical system as claimed in claim 2, wherein the first grayscale region in the first image and the second grayscale region in the first image are arranged at intervals; the first grayscale region in the second image and the second grayscale region in the second image are arranged at intervals; the first grayscale region in the first image is circular or square; and the first grayscale region in the second image is circular or square.

4. The method for calibrating the exposure surface of the optical system as claimed in claim 3, wherein the first grayscale region is a white region, and the second grayscale region is a black region.

5. The method for calibrating the exposure surface of the optical system as claimed in claim 1, wherein a lens of the photographing module is provided with an optical filter.

6. The method for calibrating the exposure surface of the optical system as claimed in claim 1, wherein performing flat-field correction on the photographing module by using the reference light source comprises:

projecting, by the reference light source, an exposure surface having a uniform irradiance value;

photographing the exposure surface of the reference light source by the photographing module, so as to obtain a reference light source image;

acquiring a grayscale output value of each pixel unit in a photosensitive chip according to the reference light source image, and comparing a preset grayscale value of the reference light source with the grayscale output value of each pixel unit, so as to obtain a grayscale correction coefficient of each pixel unit; and performing the flat-field correction on the photographing module according to the grayscale correction coefficient of each pixel unit.

7. The method for calibrating the exposure surface of the optical system as claimed in claim 6, wherein the projecting, by the reference light source, an exposure surface having a uniform irradiance value comprising: projecting, by the reference light source, several exposure surfaces having a uniform irradiance value;

the photographing the exposure surface of the reference light source by the photographing module, so as to obtain a reference light source image comprising:

photographing each exposure surface of the several exposure surfaces by the photographing module, so as to obtain several exposure surface images, wherein a first grayscale region of each exposure surface corresponds to a second grayscale region, overlapped to the first grayscale region, of remaining exposure surfaces;

processing the several exposure surface images to obtain the reference light source image.

8. The method for calibrating the exposure surface of the optical system as claimed in claim 6, wherein photographing the exposure surface of the reference light source by the photographing module, so as to obtain a reference light source image comprises:

dividing an image-taking surface of the photographing module into several image-taking sub-regions on the basis of a size of the exposure surface of the reference light source;

moving the reference light source, and respectively projecting to the image-taking sub-regions by the reference light source, so as to obtain several reference light source sub-images with each reference light source sub-image corresponding to each image-taking sub-region; and splicing the several reference light source sub-images, so as to obtain the reference light source image.

9. The method for calibrating the exposure surface of the optical system as claimed in claim 1, further comprising:

limiting an exposure of the photographing module;

adjusting an irradiance value of an exposure surface of the reference light source, and acquiring a corresponding grayscale value by using the photographing module, so as to generate a relationship curve between grayscale and the irradiance value by fitting; and on the basis of the relationship curve, performing grayscale reading, by using the photographing module, on the light projection image emitted by the optical system, so as to obtain a corresponding irradiance value.

10. The method for calibrating the exposure surface of the optical system as claimed in claim 9, wherein the adjusting an irradiance value of an exposure surface of the reference light source, and acquiring a corresponding grayscale value by using the photographing module, so as to generate a relationship curve between grayscale and the irradiance value by fitting comprising:

adjusting the irradiance value of the exposure surface of the reference light source, wherein the reference light source is exposed based on a spectral wavelength curve;

photographing the exposure surface by the photographing module, so as to obtain a corresponding gray value, wherein the gray value is obtained based on the spectral wavelength curve and a photoelectric response function of the photographing module;

obtaining the relationship curve between the gray value and the irradiance value by fitting based on the irradiance value and the corresponding gray value.

11. The method for calibrating the exposure surface of the optical system as claimed in claim 1, further comprising:

acquiring an irradiation control parameter and corresponding image information of the optical system;

acquiring a first relationship between the image information and irradiation data of the optical system; and obtaining a second relationship between the irradiation control parameter and the irradiation data of the optical system on the basis of the first relationship, the irradiation control parameter, and the corresponding image information, wherein the second relationship is configured to adjust the irradiation data during 3D printing.

12. The method for calibrating the exposure surface of the optical system as claimed in claim 11, wherein acquiring the first relationship between the image information of the optical system and the irradiation data comprises:

acquiring a third relationship between image information of the reference light source and the image information of the optical system, and a fourth relationship between the image information of the reference light source and irradiation data of the reference light source; and obtaining the first relationship at least on the basis of the third relationship and the fourth relationship, wherein the third relationship meets the image information of the reference light source being consistent with or deviating from the image information of the optical system.

13. The method for calibrating the exposure surface of the optical system as claimed in claim 1, wherein acquiring the grayscale distribution image generated by photographing the exposure surface of the optical system by the photographing module comprises:

adjusting the exposure of the photographing module, so as to cause a grayscale value of the grayscale distribution image obtained through photographing to be below a maximum grayscale value.

14. The method for calibrating the exposure surface of the optical system as claimed in claim 1, wherein a fitting algorithm is used to calculate the fitting grayscale value of each segmented region; and the fitting algorithm is a least square method, a polynomial fitting algorithm, or a cubic spline fitting algorithm.

15. The method for calibrating the exposure surface of the optical system as claimed in claim 1, wherein selecting, as the reference grayscale value, the minimum fitting grayscale value from all the fitting grayscale values obtained through calculation, and calculating, according to the reference grayscale value, the grayscale compensation coefficients corresponding to the other segmented regions, so as to generate the digital mask comprises:

successively labeling all the fitting grayscale values as $P_{11}, P_{12}, \ldots, P_{mn}$ according to a sequence of corresponding segmented regions, so as to obtain a grayscale array of $$\begin{pmatrix} P_{11} & \ldots & P_{1n} \\ \vdots & \ddots & \vdots \\ P_{m1} & \ldots & P_{mn} \end{pmatrix}$$

of which number of terms is m*n;

selecting, as the minimum fitting grayscale value, a minimum value Pmin from the grayscale array, and performing normalized ratio calculation on the minimum fitting grayscale value and other data in the grayscale array, so as to obtain a ratio matrix; and using ratios comprised in the ratio matrix as the corresponding grayscale compensation coefficients, and then multiplying a required image grayscale value and the ratios in the ratio matrix, so as to obtain the corresponding digital mask.

16. A calibration measurement method for 3D printing, comprising:

calibrating an optical system;

detecting at least one of following: a contrast ratio of the optical system; a clarity of the optical system; a dirt of the optical system; a size of an exposure surface of the optical system;

wherein calibrating an optical system comprises:

performing flat-field correction on a photographing module by using a reference light source;

acquiring a grayscale distribution image generated by photographing an exposure surface of an optical system by the photographing module;

segmenting the grayscale distribution image into a mesh image comprising a plurality of segmented regions, and calculating a fitting grayscale value of each segmented region;

selecting, as a reference grayscale value, a minimum fitting grayscale value from all the fitting grayscale values obtained through calculation, and calculating, according to the reference grayscale value, grayscale compensation coefficients corresponding to the other segmented regions, so as to generate a digital mask; and performing mask compensation, by using the digital mask, on a light projection image emitted by the optical system, so as to obtain a printed image of which the exposure surface has a uniform irradiance value.

17. The calibration measurement method for 3D printing as claimed in claim 16, wherein detecting the contrast ratio of the optical system comprising: acquiring a first irradiance value corresponding to a white image and a second irradiance value corresponding to a black image, wherein the white image and the black image are both obtained through projection of the calibrated optical system; obtaining a static contrast ratio of the optical system according to the first irradiance value and the second irradiance value; acquiring an irradiance value of each region in a chessboard map, wherein the chessboard map is obtained through projection of the calibrated optical system; and processing the irradiance value of each region by using an ANSI contrast calculation method, so as to obtain a dynamic contrast ratio of the optical system; and/or, detecting the clarity of the optical system comprising: controlling the calibrated optical system to project an image to a preset position on a light projection format, wherein the image comprises at least one line in a sagittal direction and at least one line in a meridian direction; acquiring an actual grayscale distribution curve of the projected image, and confirming a Contrast Transfer Function (CTF) value or a Modulation Transfer Function (MTF) value corresponding to each preset position according to the actual grayscale distribution curve and a preset grayscale distribution curve; and determining a clarity of the optical system according to the CTF value or the MTF value corresponding to each preset position; and/or, detecting the dirt of the optical system comprising: if a value of any point on the actual grayscale distribution curve is lower than a lower limiting value, and/or there is a mutation curve in the actual grayscale distribution curve, determining that there is dirt on the optical system; and/or, detecting the size of an exposure surface of the optical system: calibrating a size corresponding to each pixel on a photographing surface in a camera module, and determining a size of a photographed object according to the number of the pixels that are occupied by a side length of the photographed object; and/or, acquiring a size of the photographing surface in the camera module, and determining the size of the photographed object according to a ratio of the photographing surface occupied by a side length of the photographed object.

18. The calibration measurement method for 3D printing as claimed in claim 17, wherein if any CTF value is less than a first set value, or any MTF value is less than a second set value, determining that the clarity of the optical system is unqualified.

19. A system for calibrating an exposure surface of an optical system, comprising:

the optical system, comprising the exposure surface;

a photographing module, configured to acquire a grayscale distribution image of the exposure surface;

a reference light source, configured to perform flat-field correction on the photographing module;

a processor, configured to implement:

segmenting the grayscale distribution image into a mesh image comprising a plurality of segmented regions, and calculating a fitting grayscale value of each segmented region;

selecting, as a reference grayscale value, a minimum fitting grayscale value from all the fitting grayscale values obtained through calculation, and calculating, according to the reference grayscale value, grayscale compensation coefficients corresponding to the other segmented regions, so as to generate a digital mask; and performing mask compensation, by using the digital mask, on a light projection image emitted by the optical system, so as to obtain a printed image of which the exposure surface has a uniform irradiance value.

* * * * *